(12) United States Patent
Kirihara et al.

(10) Patent No.: US 7,260,149 B2
(45) Date of Patent: Aug. 21, 2007

(54) DIGITAL DATA TRANSMISSION APPARATUS, DIGITAL DATA RECEPTION APPARATUS, DIGITAL BROADCAST RECEPTION APPARATUS, DIGITAL DATA TRANSMISSION METHOD, DIGITAL DATA RECEPTION METHOD, DIGITAL BROADCAST RECEPTION METHOD, AND COMPUTER PROGRAM

(75) Inventors: Satoshi Kirihara, Kanagawa (JP); Noriyuki Yoshigahara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 10/891,107

(22) Filed: Jul. 15, 2004

(65) Prior Publication Data

US 2005/0013377 A1   Jan. 20, 2005

(30) Foreign Application Priority Data

Jul. 18, 2003   (JP) .............................. 2003-277077

(51) Int. Cl.
*H04B 1/66* (2006.01)
(52) U.S. Cl. ..................... 375/240.26; 375/240.28; 375/240.27; 382/233; 382/235; 348/522; 348/525
(58) Field of Classification Search ........... 375/240.26, 375/240.28, 240.27; 382/233, 235; 348/522, 348/525
See application file for complete search history.

(56) References Cited

U.S. PATENT DOCUMENTS 5,448,568 A *   9/1995   Delpuch et al. .......... 348/423.1

| | | | |
|---|---|---|---|
| 5,790,543 A * | 8/1998 | Cloutier | 370/252 |
| 6,233,253 B1 | 5/2001 | Settle et al. | 370/474 |
| 6,339,597 B1 * | 1/2002 | Osaki | 370/395.65 |
| 6,456,782 B1 | 9/2002 | Kubota et al. | 386/98 |
| 7,076,150 B2 | 7/2006 | Morinaga et al. | |
| 2002/0015400 A1 | 2/2002 | Morinaga | |
| 2003/0053492 A1 | 3/2003 | Matsunaga | 370/537 |
| 2005/0013495 A1 | 1/2005 | Yoshigahara | 382/233 |

FOREIGN PATENT DOCUMENTS

| | | |
|---|---|---|
| CN | 1322072 | 11/2001 |
| EP | 0 843 482 | 5/1998 |
| EP | 1 081 885 | 3/2001 |
| EP | 1 150 445 | 10/2001 |
| EP | 1150445 | 10/2001 |
| JP | 04-296182 | 10/1992 |
| JP | 2000-174813 | 6/2000 |
| JP | 2000-183841 | 6/2000 |
| JP | 2002016561 | 1/2002 |

* cited by examiner

*Primary Examiner*—Shawn S. An
(74) *Attorney, Agent, or Firm*—Fitzpatrick, Cella, Harper & Scinto

(57) ABSTRACT

A multiplexer 106 conducts time division multiplexing on various data trains input from a digital broadcast reception tuner 103 and various interfaces 104 and 105 while adding packet arrival time correction information. A demultiplexer 109 demultiplexes time division multiplexed data multiplexed by the multiplexer 106, corrects packet arrival time on the basis of the packet arrival time correction information. A PCR correction section 110 corrects a system clock on the basis of the packet arrival time correction information added by the multiplexer 106. As a result, it becomes possible to transfer an MPEG2 stream and other data in concurrent while maintaining program synchronization.

5 Claims, 16 Drawing Sheets

FIG. 9

0x10 : MPEG2-AVI
0x11 : MPEG2-TS
0x12 : MPEG2-PS
0x13 : MPEG2-Video
0x14 : MPEG2-AAC 0x20 : MPEG4-AVI
0x23 : MPEG4-Video
0x24 : MPEG4-AAC 0x30 : DV-AVI
0x33 : DV-Video
0x34 : DV-Audio 0x40 : MPEG1-AVI 0x41 : MPEG1-System
0x43 : MPEG1-Video
0x44 : MPEG1-Audio1
0x45 : MPEG1-Audio2
0x46 : MPEG1-Audio3

0x50 : JPEG-DCF
0x51 : JPEG-RAW

0x60 : MotionJPEG-AVI
0x61 : MotionJPEG-QuickTime

0x70 : MNG

0x80 : PNG

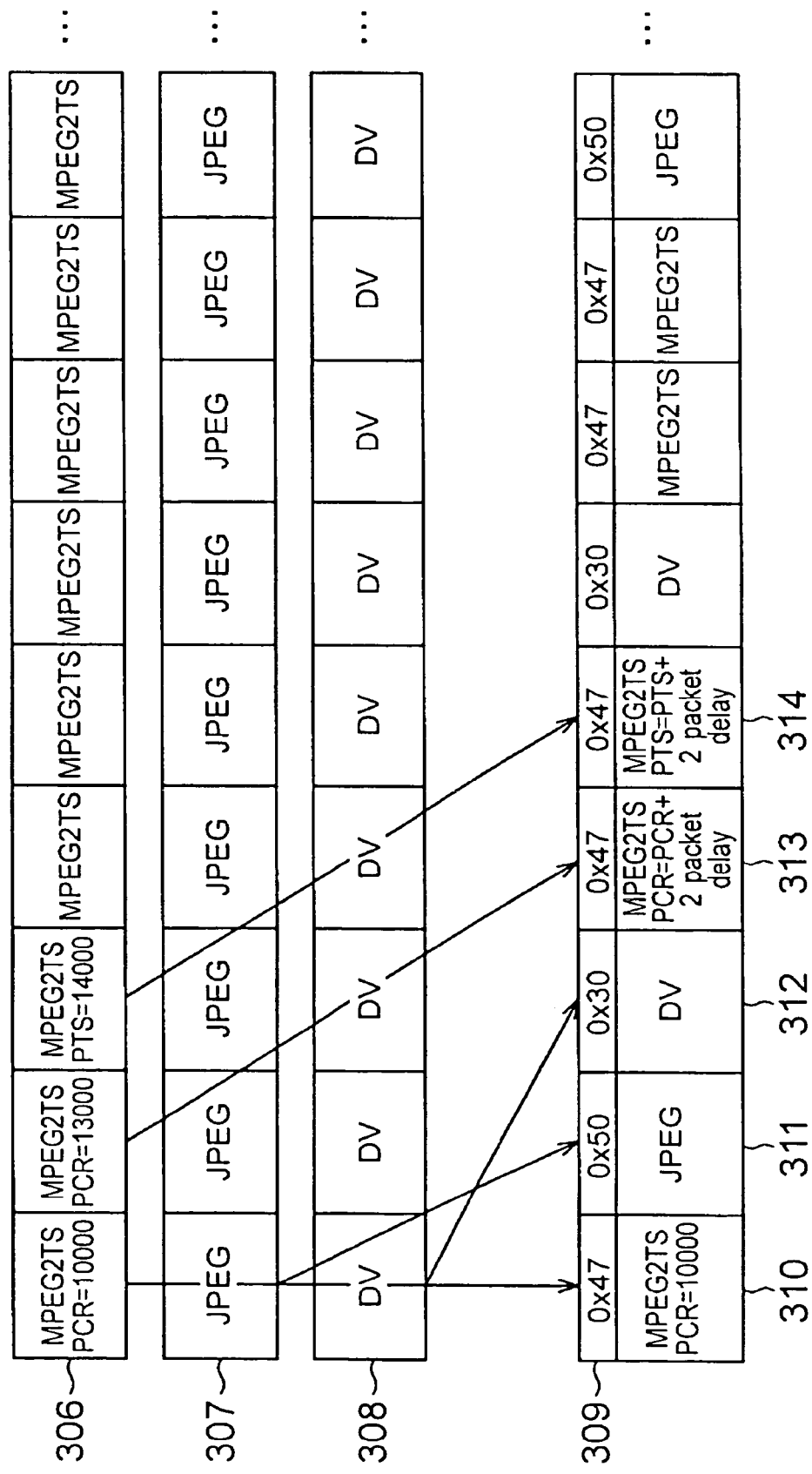

FIG. 14

| | |
|---|---|
| 0b0001 | 0x11 : MPEG2-TS |
| 0b0010 | 0x50 : JPEG-DCF |
| 0b0011 | 0x30 : DV-AVI |
| 0b0100 | 0x41 : MPEG1-System |
| 0b0101 | 0x70 : PNG |
| 0b0110 | 0x80 : MNG |
| 0b0111 | 0x00 : No Use |
| 0b1000 | 0x00 : No Use |
| 0b1001 | 0x00 : No Use |
| 0b1010 | 0x00 : No Use |
| 0b1011 | 0x00 : No Use |
| 0b1100 | 0x00 : No Use |
| 0b1101 | 0x00 : No Use |
| 0b1110 | 0x00 : No Use |
| 0b1111 | 0x00 : No Use |

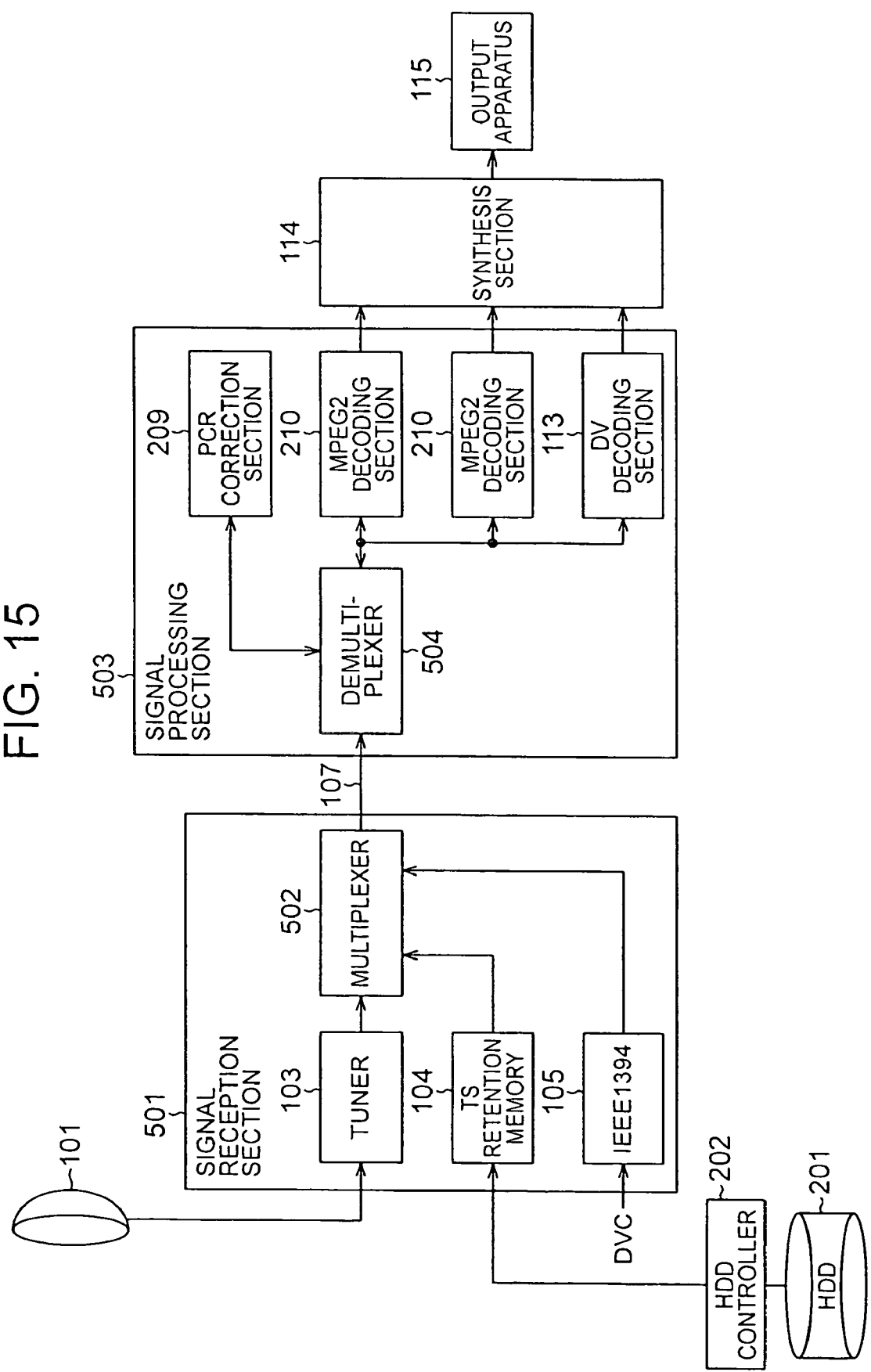

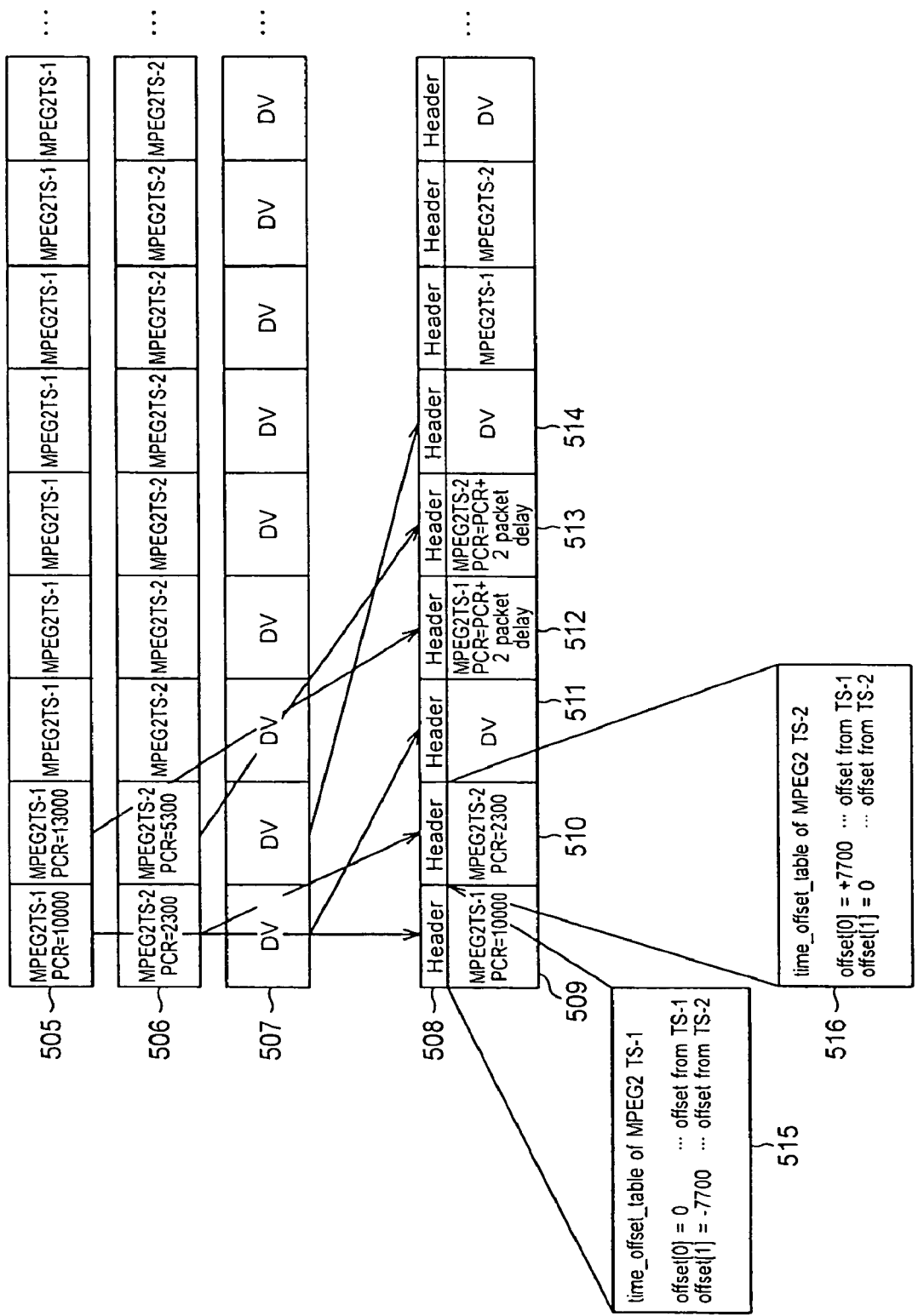

US 7,260,149 B2

DIGITAL DATA TRANSMISSION APPARATUS, DIGITAL DATA RECEPTION APPARATUS, DIGITAL BROADCAST RECEPTION APPARATUS, DIGITAL DATA TRANSMISSION METHOD, DIGITAL DATA RECEPTION METHOD, DIGITAL BROADCAST RECEPTION METHOD, AND COMPUTER PROGRAM

This application claims priority from Japanese Patent Application No.2003-277077 filed Jul. 18, 2003, which is hereby incorporated by reference.

BACKGROUND OF THE INVENTION

1. Field of the Invention

The present invention relates to a digital data transmission apparatus, a digital data reception apparatus, a digital broadcast reception apparatus, a digital data transmission method, a digital data reception method, a digital broadcast reception method, a computer program, and a computer readable recording medium. In particular, the present invention is suitable for time division multiplexing of an MPEG2 stream and arbitrary data.

2. Description of the Related Art

A TS (Transport Stream) of MPEG2 includes reference clock information called PCR (Program Clock Reference) (SCR (System Clock reference) in a PS (Program Stream) of MPEG2), and program synchronization information concerning decoding time and presentation time called DTS (Decode Time Stamp) and PTS (Presentation Time Stamp). In order to attain synchronization intended by the transmission side, the reception side needs to correct the system clock on the basis of the PCR.

In correction of the system clock, there are two kinds. In first correction, a clock value on the transmission side indicated by the PCR is set on the reception side. In second correction, a difference between PCR arrival time intended by the transmission side and actual PCR arrival time is detected as PCR fluctuation and a system clock frequency is increased or decreased in a predetermined range. Herein, the former cited operation of setting the clock value (PCR counter value) on the transmission side to the clock value on the reception side is referred to as "PCR reference time correction," whereas the latter cited PCR fluctuation correction is referred to as "PCR fluctuation correction."

A demand for transmission of a TS of MPEG2 (hereafter referred to as MPEG2 TS) concurrently with other data such as of JPEG data, DV (Digital Video) data or the like input from an external input apparatus after reception of the MPEG2 TS is conceivable in the case where a transmission path is present between an input management section for managing an input and a signal processing section for conducting data processing. As described above, however, the MPEG2 TS is subject to the PCR reference time correction and the PCR fluctuation correction according to the arrival time of the PCR. Therefore, it is not easy to conduct time division multiplexing on the MPEG2 TS and arbitrary data. Herein, "arbitrary data" refers to image data, voice data, and control system data.

Typically, when transferring an MPEG2 TS from a certain processing section to another processing section, the MPEG2 TS occupies the transmission path, and concurrent transfer of the MPEG2 TS and other data is not conducted. Or if the transmission path is shared by the MPEG2 TS and other data, program synchronization using the PCR is not conducted and the program synchronization information is discarded. According to a typical method for reflecting synchronization information such as the PCR as well while transmitting JPEG and DV information in concurrent with a MPEG2 TS in the conventional technique, the MPEG2 TS is temporarily demultiplexed, and the demultiplexed MPEG2 TS and the JPEG and DV information are multiplexed again into a MPEG2 TS. This method has a problem that both the quantity of processing and the memory in use increase.

Japanese Patent Application Laid-Open (JP-A) No. 2000-183841 discloses a method for multiplexing a plurality of TSs into one TS without conducting demultiplexing. However, multiplexing of a MPEG2 TS and arbitrary data is not mentioned, and the method cannot be applied to arbitrary data.

SUMMARY OF THE INVENTION

The present invention has been achieved in order to solve the above-described problem. An object of the present invention is to make it possible to transfer an MPEG2 stream and other data in concurrent while maintaining program synchronization.

One aspect of the present invention provides a digital data transmission apparatus, which divides a plurality of MPEG2 transport streams or a plurality of MPEG2 program streams and a plurality of arbitrary data into packets having the same size, adds packet arrival time correction information to packets obtained by the dividing, conducts time division multiplexing on the packets, and thereby generates a multiplexed stream.

Another aspect of the present invention provides a digital data transmission apparatus, which divides a plurality of MPEG2 transport streams and a plurality of arbitrary data into packets each having 188 bytes, which is a data packet size of the MPEG2 transport streams, alters an SYNC pattern of the MPEG2 transport streams to a pattern which differs depending upon contents of packets to be multiplexed, adds the resultant SYNC pattern to packets obtained by the dividing, and thereby generates a multiplexed stream.

Still another aspect of the present invention provides a digital data reception apparatus, which includes a demultiplexer for demultiplexing a multiplexed stream, the multiplexed stream being generated by dividing a plurality of MPEG2 transport streams or a plurality of MPEG2 program streams and a plurality of arbitrary data into packets having the same size, adding packet arrival time correction information to packets obtained by the dividing, and conducting time division multiplexing on the packets, and a time information correction section for correcting time information of the multiplexed stream on the basis of the packet arrival time correction information.

Still another aspect of the present invention provides a digital broadcast reception apparatus, which includes a multiplexer for dividing a plurality of MPEG2 transport streams or a plurality of MPEG2 program streams and a plurality of arbitrary data into packets having the same size, adding packet arrival time correction information to packets obtained by the dividing, conducting time division multiplexing on the packets, and thereby generating a multiplexed stream, a demultiplexer for demultiplexing the multiplexed stream generated by the multiplexer, and a time information correction section for correcting time information of the multiplexed stream on the basis of the packet arrival time correction information added by the multiplexer.

According to the present invention, it becomes possible to transfer a MPEG2 stream an other data in concurrent while maintaining the program synchronization, by slightly modifying the transmission side and the reception side of an existing apparatus. Furthermore, it also becomes possible to transfer a plurality of MPEG2 streams in concurrent.

BRIEF DESCRIPTION OF THE DRAWINGS

FIG. 9 is a diagram showing an example of an SYNC pattern added by a multiplexer in the third embodiment of the present invention;

FIG. 11 is a schematic diagram showing a structure example of a multiplexed packet train generated by a multiplexer in the third embodiment of the present invention;

FIG. 14 is a diagram showing an example of a correspondence table of an SYNC pattern generated by a multiplexer in the fourth embodiment of the present invention;

FIG. 15 is a block diagram showing a configuration example of a digital broadcast reception apparatus in a fifth embodiment of the present invention; and FIG. 16 is a schematic diagram showing a structure example of a multiplexed packet generated by a multiplexer in the fifth embodiment of the present invention.

DETAILED DESCRIPTION OF THE PREFERRED EMBODIMENTS

First Embodiment

Figure 1:
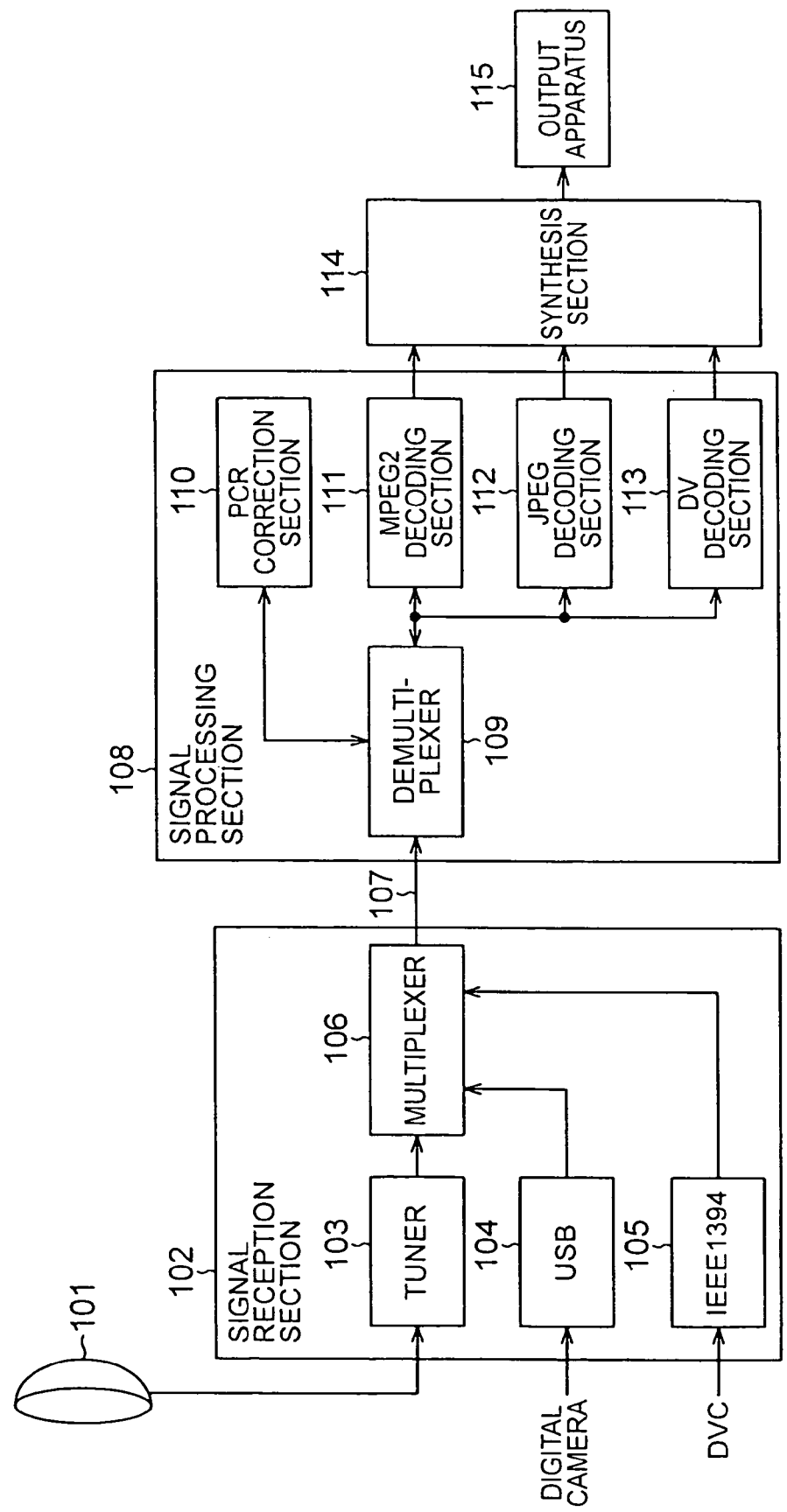
FIG. 1 is a block diagram showing a configuration example of a digital broadcast reception apparatus in a first embodiment of the present invention.

Hereafter, a first embodiment of the present invention will be described with reference to the drawings. FIG. 1 is a block diagram showing a configuration example of a digital broadcast reception apparatus in a first embodiment of the present invention.

In the present embodiment, a signal reception section receives an MPEG2 TS input from a tuner, JPEG data input from a digital camera, and a DV stream input from a DVC (Digital Video Camera), conducts time division multiplexing on them, and transmits a resultant signal to a signal processing section, and the signal processing section decodes the MPEG2 TS, JPEG, DV, and synthesizes and displays an output image.

In FIG. 1, numeral 101 denotes an antenna for receiving a digital broadcast wave, 102 a signal reception section (which is also a digital data transmission apparatus in the present invention) in the present system, 103 a digital broadcast reception tuner, 104 a USB interface disposed as an input/output interface for a digital camera or the like, and 105 an IEEE1394 interface disposed as an input/output interface for a DVC or the like.

Numeral 106 denotes a multiplexer for conducting time division multiplexing on various data trains input from the digital broadcast reception tuner 103 and various interfaces 104 and 105 while adding packet arrival time correction information. Numeral 108 denotes a signal processing section (which is also a digital data reception apparatus in the present invention) in the present system. Numeral 107 denotes a transmission path for transmitting a signal from the signal reception section 102 to the signal processing section 108. Numeral 109 denotes a demultiplexer for demultiplexing time division multiplexed data multiplexed by the multiplexer 106. Numeral 110 denotes a PCR correction section for correcting a system clock on the basis of packet arrival time correction information added by the multiplexer 106. Numeral 111 denotes an MPEG2 decoding section for decoding MPEG2 data. Numeral 112 denotes a JPEG decoding section for decoding JPEG data. Numeral 113 denotes a DV decoding section for decoding DV data. Numeral 114 denotes a synthesis section for synthesizing an image on a screen on the basis of outputs of the MPEG2 decoding section 111, the JPEG decoding section 112 and the DV decoding section 113. Numeral 115 denotes an image display apparatus (output apparatus) such as a CRT (Cathode Ray Tube) monitor.

The signal reception section 102 in the present system receives a digital broadcast signal received by the antenna 101, an image signal supplied from the digital camera, and a DV signal supplied from a DVC. The signal reception section 102 is a processing section for conducting processing on an input signal based on the user's input and the data input. The signal reception section 102 has a digital broadcast reception tuner 103, a USB interface 104 and an IEEE 1394 interface 105. The digital broadcast reception tuner 103, the USB interface 104 and the IEEE 1394 interface 105 receive a MPEG2 signal of digital broadcast, a JPEG signal from the digital camera, and a DV stream from the DVC, respectively. The received signals are sent to the multiplexer 106 and multiplexed therein.

Figure 2:
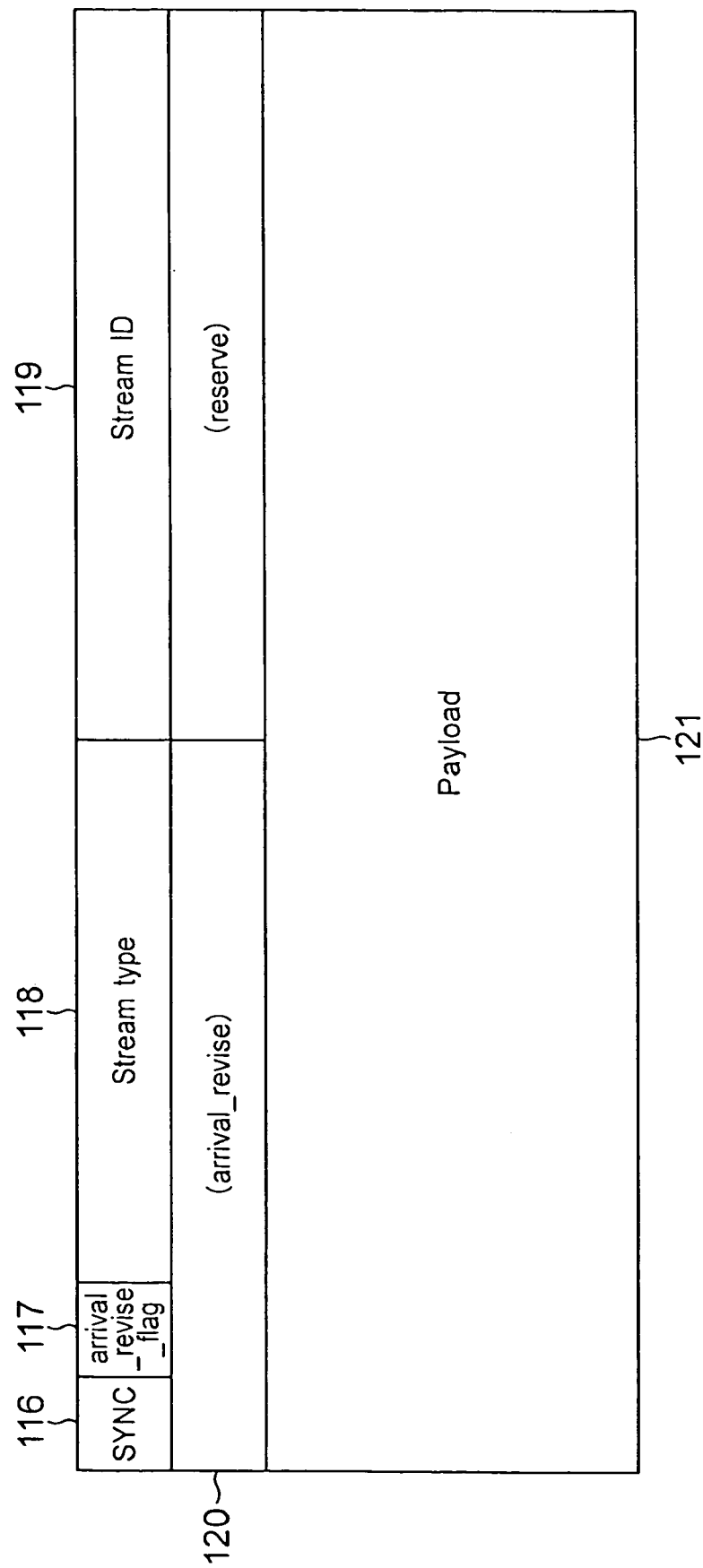
FIG. 2 is a schematic diagram showing a structure example of a multiplexed packet generated by a multiplexer in the first embodiment of the present invention.

A multiplexed packet has, for example, a form as shown in FIG. 2. In FIG. 2, numeral 116 denotes a SYNC region for identifying the head of a packet. Numeral 117 denotes an arrival_revise_flag region for indicating whether arrival_revise has been added to the packet. Numeral 118 denotes a stream_type region for indicating a kind of data stored in a payload region 121 of the packet. Numeral 119 denotes a stream_ID region indicating a stream number. Numeral 120 denotes an arrival_revise region for indicating PCR correction information. Numeral 121 denotes a payload region for storing the substance of each data.

Stream data input from the digital broadcast reception tuner 103 and various interfaces 104 and 105 enter the payload region 121, and various headers 116 to 120 are added thereto. In particular, information in the arrival_revise region 120 is information of the packet arrival time, and it is important. In the present embodiment, added information is the number of JPEG packets and DV packets inserted between original MPEG2 packets.

The signals multiplexed by the multiplexer 106 are sent to the signal processing section 108 in the system via the transmission path 107. The band on the transmission path 107 is arbitrary. The signal processing section 108 is a processing section for decoding the signal group input from the transmission path 107 and outputting the decoded signals.

The demultiplexer 109 receives packets multiplexed by the multiplexer 106, and conducts demultiplexing processing. Furthermore, the demultiplexer 109 calculates a PCR correction value on the basis of the PCR information added to the original TS packets, the packet arrival time correction information added by the multiplexer 106, i.e., the number of packets inserted between the original TS packets, and the bit rate on the transmission path 107, and sends the calculated PCR correction value to the PCR correction section 110.

The PCR correction section 110 corrects the system clock in PCR fluctuation on the basis of the information. If the PCR reference time correction has not been conducted, then the PCR correction section 110 conducts PCR reference time correction on the system clock. The MPEG2 decoding section 111 conducts the ordinary MPEG2 decoding, and outputs an image and voice on the basis of the system clock corrected by the PCR correction section 110. The JPEG decoding section 112 and the DV decoding section 113 may be ordinary ones. Resultant images are synthesized by the synthesis section 114, and output from the image display apparatus (output apparatus) 115 as a multi-view.

Operation of the multiplexer 106 will now be described concretely. The multiplexer 106 receives inputs from the digital broadcast reception tuner 103 and the input/output interfaces 104 and 105, and generates data of a packet form having a fixed size as shown in FIG. 2 from respective data. The packet size may be arbitrary. Each stream main body is disposed in the payload region 121. Packets are arranged in appropriate order, and output from the transmission path 107. The packet order may be determined as desired. In the present embodiment, packets are arranged in the order in which packets are input from the digital broadcast reception tuner 103 and the input/output interfaces 104 and 105. A schematic diagram of multiplexing is shown in FIG. 3.

Figure 3:
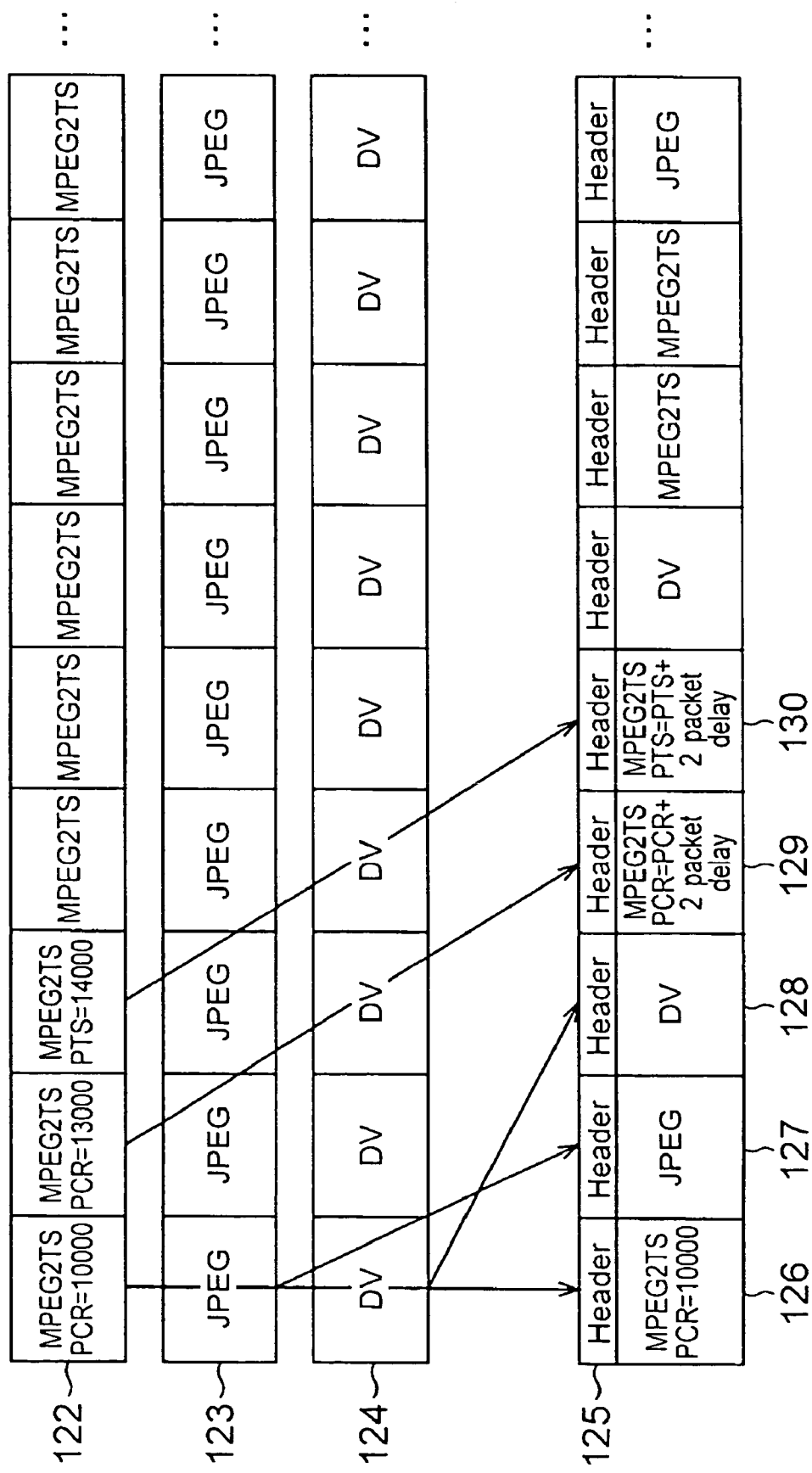
FIG. 3 is a schematic diagram showing a structure example of a multiplexed packet train generated by a multiplexer in the first embodiment of the present invention.

In FIG. 3, numeral 122 denotes an original MPEG2 TS stream. Numeral 123 denotes an original JPEG stream. Numeral 124 denotes an original DV stream. Numeral 125 denotes a multiplexed stream generated in the present embodiment. Numeral 126 denotes a first MPEG2 TS packet, 127 a first JPEG packet, 128 a first DV packet, 129 a second MPEG2 TS packet, and 130 a third MPEG2 TS packet.

Information added by the multiplexer 106 and operation of the demultiplexer 109 and the PCR correction section 110 will now be described more concretely.

The information added by the multiplexer 106 includes two kinds: information added to make it possible for the demultiplexer 109 to demultiplex the multiplexed information, and information added as the packet arrival time correction information.

As the former cited information, SYNC information (SYNC region 116) for identifying the head of a packet, information (stream_type region 118) indicating a type (such as MPEG2 TS, JPEG or DV) of a stream contained in the payload region 121 of the packet, and information (stream_ID region 119) indicating a stream number (such as No. 3 in the MPEG2 TS or No. 2 in the JPEG) are added. The SYNC information may be a predetermined arbitrary value. However, 0×47 (As used herein, "0x . . . " indicates a number expressed in hexadecimal format.) should be avoided because it is an identifier of the MPEG2 TS.

As the latter cited information, there are information (arrival_revise_flag region 117) indicating whether packet arrival time correction information has been added to the packet, and the packet arrival time correction information main body (arrival_revise region 120).

The number of arbitrary packets inserted between the original MPEG2 TS packets is added to the arrival_revise region 120 in which the packet arrival time correction information is indicated by the multiplexer 106. For example, in the example shown in FIG. 3, the first MPEG2 TS packet 126 and the second MPEG2 TS packet 129 are consecutive packets on the original MPEG2 TS stream 122. However, the first JPEG packet 127 and the first DV packet 128 are inserted between the first MPEG2 TS packet 126 and the second MPEG2 TS packet 129 by the multiplexer 106. Therefore, a numerical value "2" is added to the arrival_revise region 120 in the second MPEG2 TS packet 129.

The demultiplexer 109 conducts demultiplexing on the basis of information for demultiplexing added by the multiplexer 105, and corrects packet arrival time indicated by the PCR on the basis of the packet arrival time correction information. Specifically, the demultiplexer 109 corrects the original arrival time indicated by the PCR so as to obtain a delayed PCR value on the basis of the value indicated in the arrival_revise region 120, the packet size and the bit rate. For example, supposing that the value indicated in the arrival_revise region 120, the packet size, and the bit rate are respectively 2 packets, 256 bytes, and 30 Mbps (=30×1024× 1024÷8 bytes/sec=3932160 bytes/sec) in the example shown in FIG. 3, The PCR correction value ΔPCR becomes as represented by the following expression (1).

$$\Delta PCR[sec]=2[\text{packets}]\times 256\,[\text{bytes}]/3932160\,[\text{bytes}/sec]\approx 0.0001302\,[sec] \quad \text{expression (1)}$$

Since the PCR count value ΔPCR (2 packet delay shown in FIG. 3) has a precision of 27 MHz, the actual PCR correction value becomes as represented by expression (2)

$$\Delta PCR[\text{counter value}]=0.0001302\,[sec]\times 27000000\,[Hz]\approx 3515[\text{counter value}] \quad \text{expression (2)}$$

As shown in FIG. 3, therefore, the PCR value in the second MPEG2 TS packet 129 can be represented by "the original PCR (=13000)+2 packet delay (=3515)". Accordingly, the PCR value in the second MPEG2 TS packet 129 becomes 16515 obtained by adding 3515 to 13000.

The PCR correction section 110 calculates the PCR fluctuation quantity by using the PCR value corrected by means of the packet arrival time correction information and using the actual arrival time, and corrects the system clock in PCR fluctuation. The PCR correction section 110 conducts the PCR reference time correction as well. The MPEG2 decoding section 111 and the synthesis section 114 need the PTS/DTS for decoding and display. The demultiplexer 109 retains the corrected value obtained by correcting the PCR, and the PTS/DTS value. In response to a PTS/DTS enquiry from the MPEG2 decoding section 111 and the synthesis section 114, the demultiplexer 109 gives notice of a value corrected in the same way as the PCR. In the example shown in FIG. 3, a third MPEG2 TS packet 130 originally has a PTS of 14000. Since the PCR has been corrected on the basis of the above-described calculation expression, however, the PTS is corrected in the same way. The actual PTS value becomes 17515 obtained by adding 3515 to 14000.

Owing to the configuration and processing heretofore described, it becomes possible to multiplex the MPEG2 TS with arbitrary data while maintaining the program synchronization information. Furthermore, it also becomes possible to multiplex a plurality of MPEG2 TSs while maintaining the program synchronization information.

In the present embodiment, it has been supposed for brevity that the bit rate on the transmission path 107 is the same as the intended bit rates of the input streams. In fact, however, it does not hold true in some cases. In that case, it is necessary to first conduct correction on the arrival time on the basis of a difference between the bit rate on the transmission path 107 and the intended bit rate of the stream. The correction can be conducted by using the technique described with reference to the present embodiment.

Furthermore, in the present embodiment, the packet arrival time is corrected by using the number of new packets inserted by the multiplexer 106 as it is. However, the correction means for the packet arrival time is not limited to this. For example, the calculation may be conducted in the multiplexer 106 instead of the demultiplexer 109 and the result of the calculation may be described on the packet.

In this case, the packet arrival time correction information becomes, for example, information obtained by correcting the PCR added to the second MPEG2 TS packet 129 on the basis of information base on the number of packets inserted between the first MPEG2 TS packet 126 and the second MPEG2 TS packet 129.

In addition, the present embodiment shows one example of the present invention, and the present embodiment does not restrain the present invention. The system configuration and the structure of the multiplexed packet can be altered as long as they are based on the spirit of the present invention.

The present embodiment has been described by taking an MPEG2 TS as an example. Even if an MPEG2 PS is used, however, processing can be conducted in the same way as the foregoing description.

Second Embodiment

Figure 4:
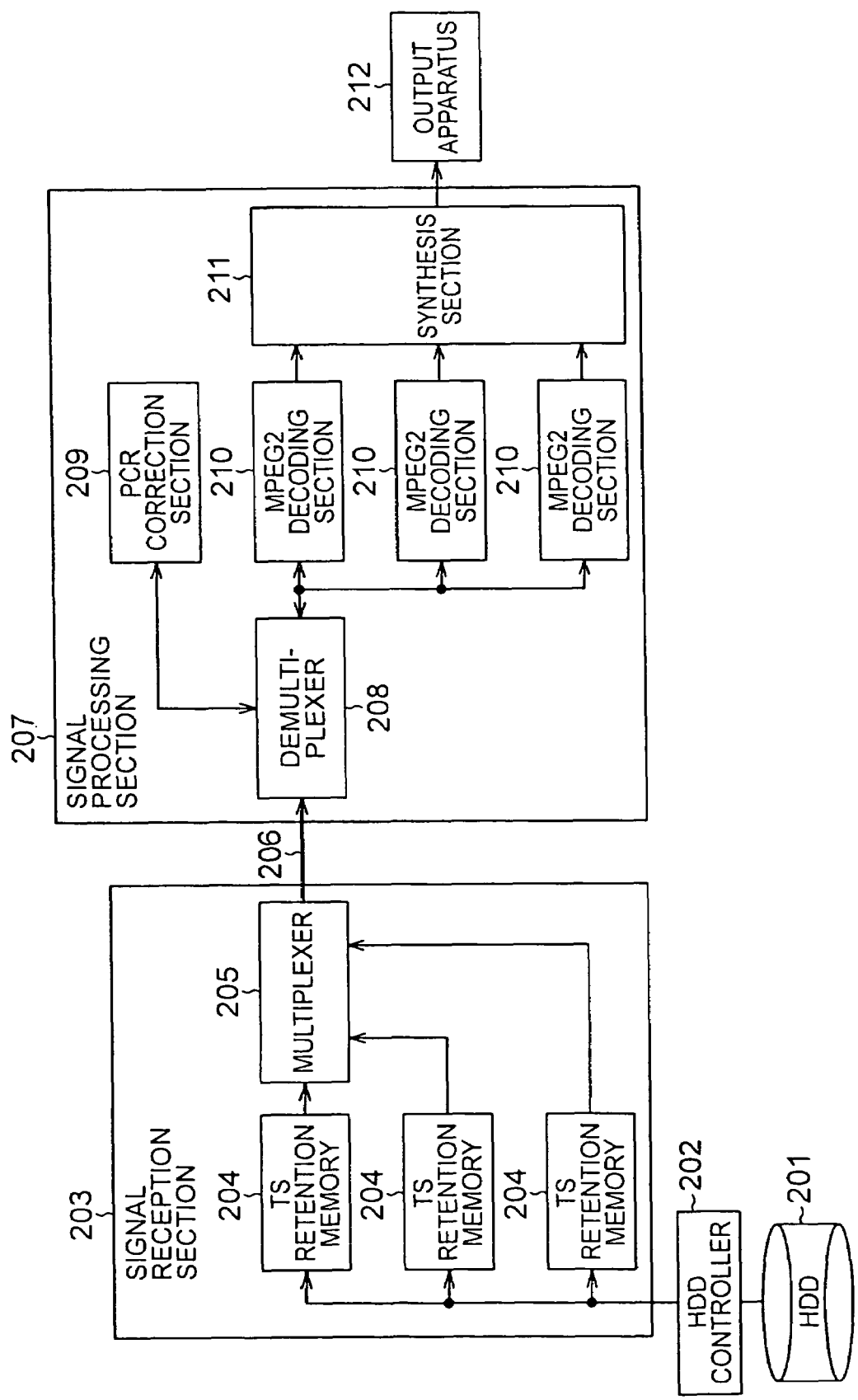
FIG. 4 is a block diagram showing a configuration example of a digital broadcast reception apparatus in a second embodiment of the present invention.

Hereafter, a second embodiment of the present invention will be described with reference to the drawings. FIG. 4 is a block diagram showing a configuration example of a digital broadcast reception apparatus according to the present embodiment.

In the present embodiment, the signal reception section receives three MPEG2 TSs input from a hard disk, which stores recorded programs, conducts time division multiplexing on the three MPEG2 TSs, and transmits a resultant signal to the signal processing section. The signal processing section decodes the three MPEG2 TSs, and synthesizes and displays an output image.

In FIG. 4, numeral 201 denotes a hard disk (HDD) for storing digital broadcast, 202 a hard disk controller (HDD controller), 203 a signal reception section in the present system, and 204 a TS retention memory for retaining a TS read out from the HDD 201. Numeral 205 denotes a multiplexer for conducting time division multiplexing on the plurality of TSs read out from the TS retention memories 204 while adding the packet arrival time correction information and inter-stream PCR difference information. Numeral 207 denotes a signal processing section in the present system. Numeral 206 denotes a transmission path for transmitting a signal from the signal reception section 203 to the signal processing section 207. Numeral 208 denotes a demultiplexer for demultiplexing time division multiplex data multiplexed by the multiplexer 205. Numeral 209 denotes a PCR correction section for correcting a system clock on the basis of the packet arrival time correction information and inter-stream PCR difference information added by the multiplexer 205. Numeral 210 denotes an MPEG2 decoding section for decoding various MPEG2 TSs. Numeral 211 denotes a synthesis section for synthesizing images output by the MPEG2 decoding sections 210 on a screen. Numeral 212 denotes an image display apparatus (output apparatus) such as a CRT monitor.

If the user selects a plurality of MPEG2 TS programs stored on the HDD 201, then the TSs are input to the signal reception section 203 in the present system via the HDD controller 202. The signal reception section 203 includes the TS retention memories 204 and the multiplexer 205. The TS retention memory 204 stores each of the MPEG2 TS streams input from the HDD controller 202. In the present embodiment, three TS retention memories 204 are shown supposing that three TSs are input. However, FIG. 4 is a schematic diagram, it is sufficient for the TS retention memories that there are three regions logically.

Figure 5:
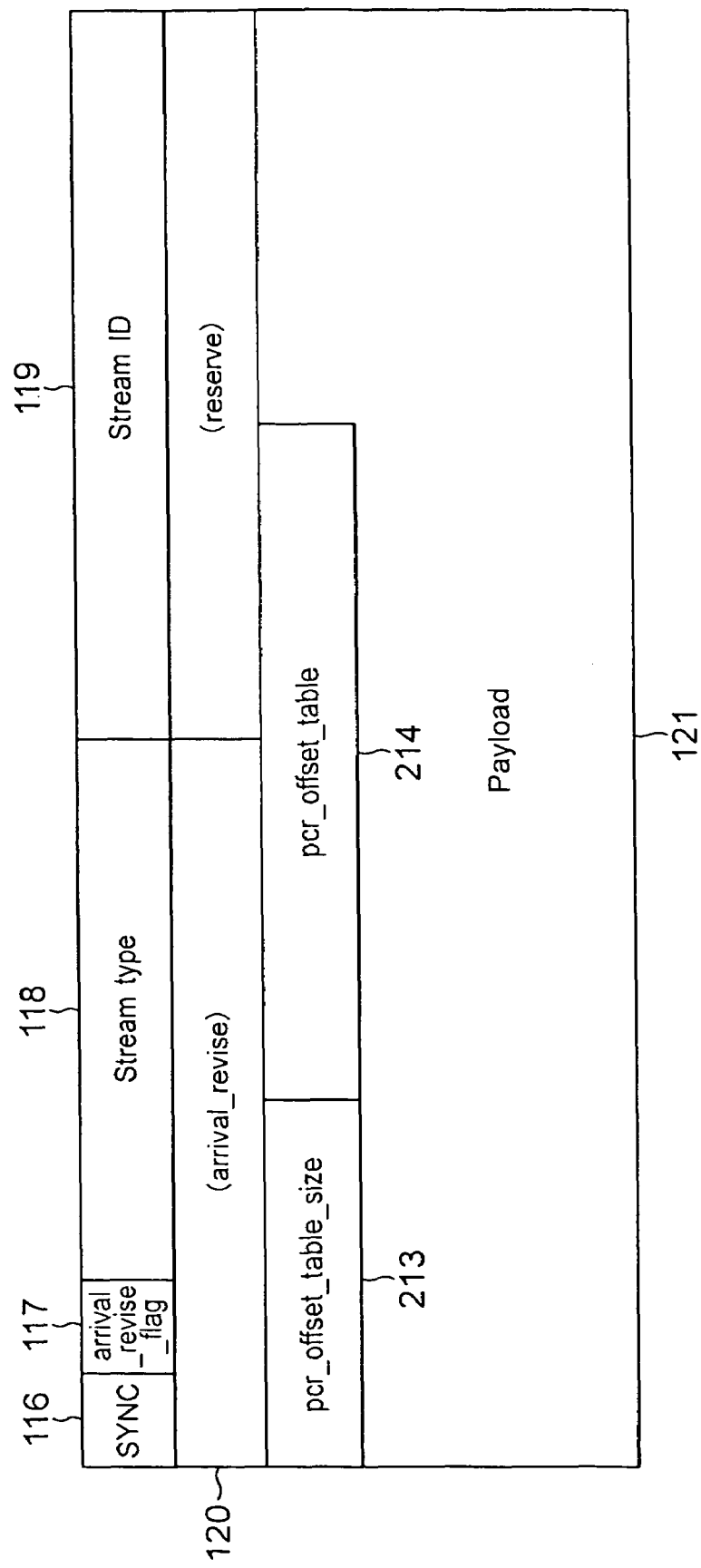
FIG. 5 is a schematic diagram showing a structure example of a multiplexed packet generated by a multiplexer in the second embodiment of the present invention.

An example of a packet generated by the multiplexer 205 is shown in FIG. 5.

In FIG. 5, a region having the same meaning as that in the first embodiment is denoted by the same reference numeral as that in FIG. 2 and detailed description thereof will be omitted. Numeral 213 denotes a pcr_offset table_size region indicating a size of a table added as inter-stream PCR difference information. Numeral 214 denotes a pcr_offset_table region indicating the inter-stream PCR difference information.

The substance of each MPEG2 TS enters the payload region 121. Various headers 116 to 120, the pcr_offset_table_size region 213, and the pcr_offset_table region 214 are added. In the header information, the arrival_revise region 120 is added as the packet arrival time correction information. In the present embodiment, the added information is the number of different MPEG2 TS packets inserted between the original MPEG2 TS packets.

Furthermore, in the pcr_offset_table region 214, difference values between PCRs included in respective MPEG2 TSs are added in a table form as the inter-stream PCR difference information. In order to fix the size of the pcr_offset_table region 214 in the packet, the table size is added to the pcr_offset_table_size region 213.

The signals multiplexed by the multiplexer 205 are sent to the signal processing section 207 in the system via the transmission path 206. The band on the transmission path 206 is arbitrary. The signal processing section 207 is a processing section for decoding the signal group input from the transmission path 206 and outputting the decoded signal group.

The demultiplexer 208 demultiplexes the packets multiplexed by the multiplexer 205, and corrects the PCR value, which indicates the packet arrival time, on the basis of the packet arrival time correction information (the arrival_revise region 120).

Furthermore, the demultiplexer 208 sends a PCR value of an MPEG2 TS serving as the reference for correcting the system clock selected by the user or the system, which has been corrected on the basis of the packet arrival time correction information, to the PCR correction section 209. The system clock is single. Even if there are a plurality of MPEG2 TSs, only one stream serves as the reference for the PCR fluctuation correction.

The PCR correction section 209 conducts PCR fluctuation correction on the system clock on the basis of the PCR value corrected by using the packet arrival time correction information, of the TS selected as the reference. The PCR correction section 209 conducts the PCR reference time correction as well. As for streams that have not been selected as the PCR reference stream, the PCR correction section 209 corrects PCR values on the basis of the inter-stream PCR difference information (pcr_offset_table region 214).

The MPEG2 decoding sections 210 decode respective MPEG2 TSs, and output respective streams in accordance with the system clock corrected by the PCR correction section 209. Resultant streams are synthesized in the synthesis section 211, and output from the image display apparatus (output apparatus) 212 as a multi-view.

Operation of the multiplexer 205 and the inter-stream PCR difference information will now be described concretely.

Packet multiplexing operation in the multiplexer 205 is conducted in the same way as that in the first embodiment. Information added for demultiplexing to be conducted in the demultiplexer 208 is the same as that in the first embodiment.

The present embodiment differs from the first embodiment in that there are a plurality of MPEG2 TSs, i.e., a plurality of streams each having program synchronization information. Even if there are a plurality of streams each having program synchronization information, obviously only one stream can reflect the PCR reference time correction and the PCR fluctuation correction in the system clock because a single system clock is used. The PCR reference time correction and PCR fluctuation correction are conducted on the selected stream. As regards this point, therefore, the present embodiment does not differ from the first embodiment.

Since streams have PCRs generated at different times, it is necessary to correct them to the same time. The stream serving as the reference for correcting them to the same time becomes the same as the stream for reflecting the PCR fluctuation correction. This selection is conducted by the user or the system. The selection technique is not prescribed. For example, a method of using a stream that occupies the widest area on a currently displayed view as the reference is conceivable.

In order to implement this, the multiplexer 205 adds the packet arrival time correction information used in the present first embodiment, i.e., the number of packets inserted between the original MPEG2 TSs to the arrival_revise region 120. In addition, the multiplexer 205 adds the relative relations among PCR values of each streams at certain time to the pcr_offset_table region 214 as the inter-program PCR difference information region. An example of the multiplexed stream generated by the multiplexer 205 and the inter-program PCR difference information is shown in FIG. 6.

Figure 6:
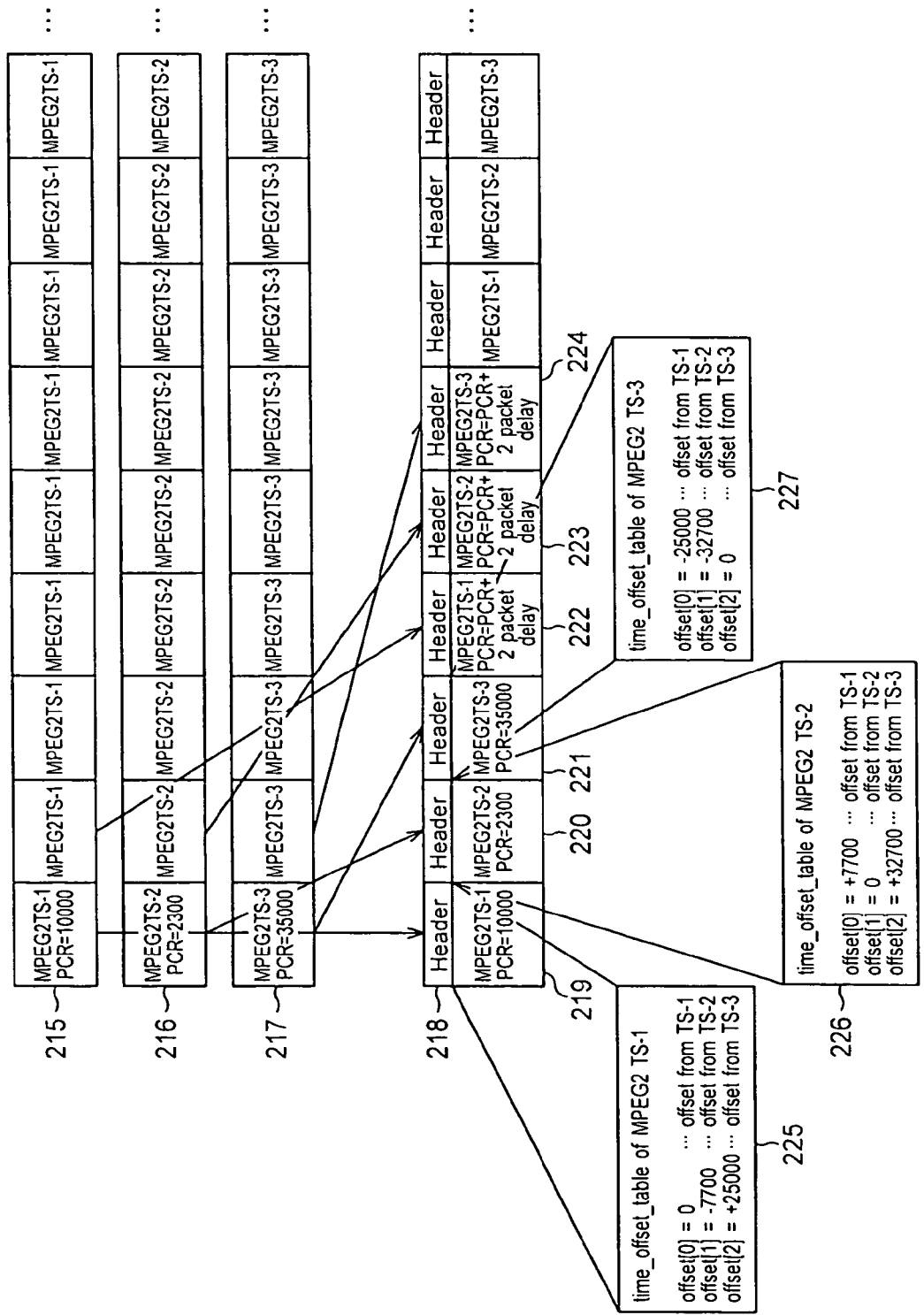
FIG. 6 is a schematic diagram showing a structure example of a multiplexed packet train generated by a multiplexer and an addition example of second PCR correction information in the second embodiment of the present invention.

In FIG. 6, numeral 215 denotes an original MPEG2 TS-1 stream, 216 an original MPEG2 TS-2 stream, and 217 an original MPEG2 TS-3 stream. Numeral 218 denotes a multiplexed stream according to the present embodiment. Numeral 219 denotes a first MPEG2 TS-1 packet, 220 a first MPEG2 TS-2 packet, and 221 a first MPEG2 TS-3 packet. Numeral 222 denotes a second MPEG2 TS-1 packet, 223 a second MPEG2 TS-2 packet, and 224 a second MPEG2 TS-3 packet. Numeral 225 denotes a pcr_offset_table added to the first MPEG2 TS-1 packet 219, 226 a pcr_offset_table added to the first MPEG2 TS-2 packet 220, and 227 a pcr_offset_table added to the first MPEG2 TS-3 packet 221.

Each inter-program PCR difference information has PCR difference information among all streams. This aims at preventing the program synchronization information from failing even if the user or system selects any stream as the clock reference.

Upon receiving a packet including the PCR, the demultiplexer 208 checks whether the stream including the packet has been selected as the clock reference. If the stream including the packet is a stream (clock reference stream) selected as the clock reference, then the inter-stream PCR difference information is not used. In this case, the demultiplexer 208 corrects the PCR value on the basis of the packet arrival time correction information and notifies the PCR correction section 209 of the PCR correction value in the same way as the first embodiment.

On the other hand, if the stream including the packet is not a clock reference stream, then the demultiplexer 208 first corrects the PCR value on the basis of the packet arrival time correction information, acquires a difference value between the clock reference stream and its own PCR on the basis of the inter-stream PCR difference information, and corrects the PCR value.

With reference to the example shown in FIG. 6, concrete PCR value correction will now be described. If the MPEG2 TS-1 is specified as the stream reference, then operation is conducted in the same way as the first embodiment as regards the MPEG2 TS-1. In other words, it is indicated in the arrival_revise region 120, which is the packet arrival time correction information, that there are two packets between the original MPEG2 TSs in the same way as the first embodiment. Supposing that the first MPEG2 TS-1 packet 219 and the second MPEG2 TS-1 packet are respectively 10000 and 13000 in PCR and the packet size and the bit rate are respectively 256 bytes and 30 Mbps, the PCR value based on the packet arrival time correction information becomes 13515 (10000+3515=13515) as calculated in the first embodiment.

Time correction conducted for the MPEG2 TS-2 and MPEG2 TS-3 when the MPEG2 TS-1 has been selected as the PCR reference will now be described. First, in both the first MPEG2 TS-2 packet 220 and the first MPEG2 TS-3 packet 221, "2" is indicated in the arrival_revise region representing the packet arrival time correction information. As calculated in the first embodiment, a first PCR value is obtained by adding 3515 to each PCR. As for the MPEG2 TS-2, it is found that the PCR offset for the MPEG2 TS-1 is +7700 on the basis of pcr_offset_table 226 added to the first MPEG2 TS-2 packet 220. Therefore, addition is conducted. The PCR value after application of the inter-program PCR difference information becomes 13515 by adding up 2300, 3515 and 7700 (2300+3515+7700). As for the MPEG2 TS-3 as well, a similar calculation is conducted and the PCR value becomes 13515. In this example, since the number of packets inserted between is the same and the PCR is acquired at the same timing, all of the PCRs after the correction become the same value and the program synchronization can be attained.

A technique for generating pcr_offset_table serving as the inter-program PCR difference information will now be described specifically with reference to FIG. 7.

Figure 7:
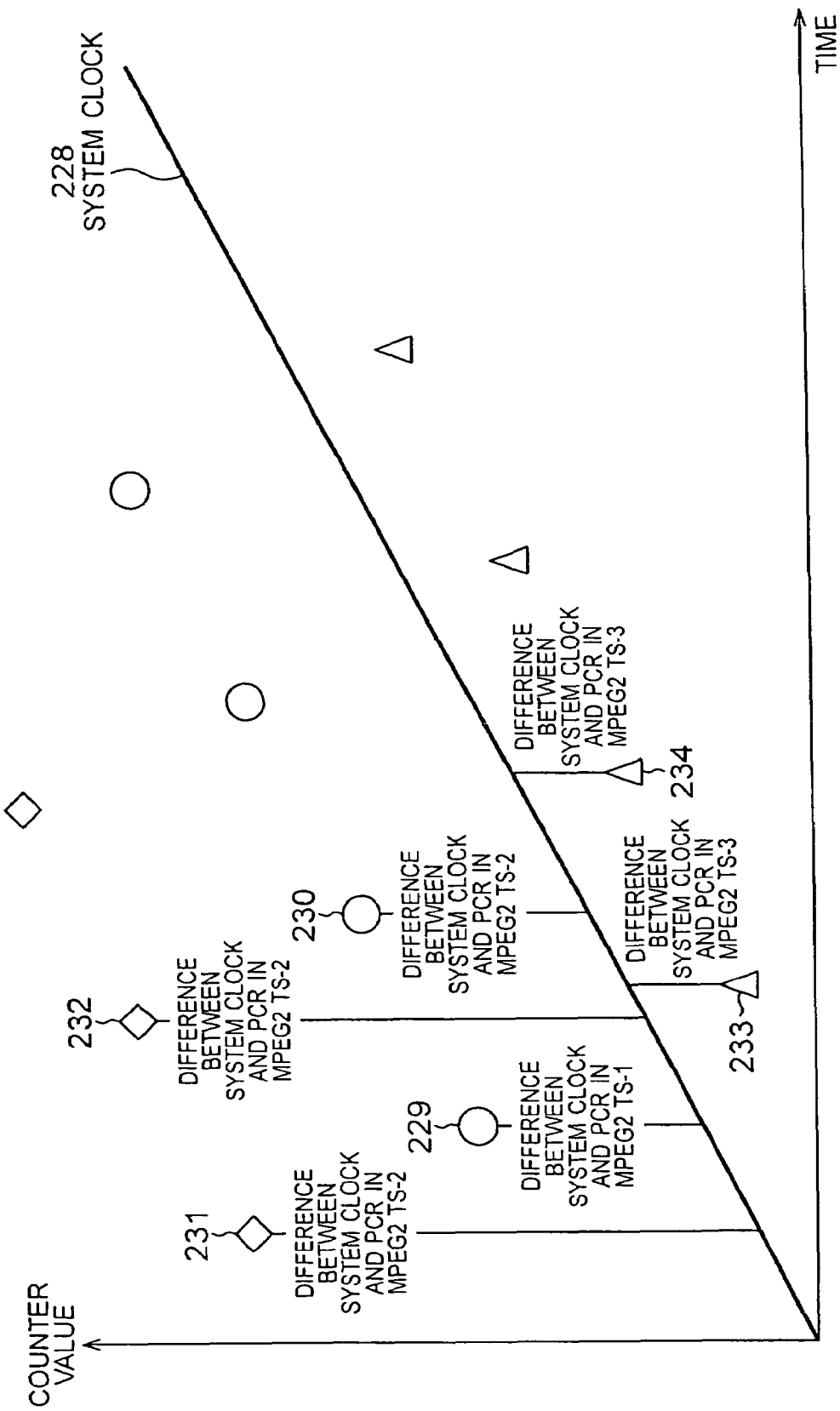
FIG. 7 is a schematic diagram showing a technique example for generating pcr_offset_table in the second embodiment of the present invention.

In FIG. 7, numeral 228 denotes a straight line indicating the system clock value. Numeral 229 denotes a PCR value of the first MPEG2 TS-1 packet 219, 230 a PCR value of the second MPEG2 TS-1 packet 222, and 231 a PCR value of the first MPEG2 TS-2 packet 220, 232 denotes a PCR value of the second MPEG2 TS-2 packet 223, 233 a PCR value of the first MPEG2 TS-3 packet 221, and 234 a PCR value of the second MPEG2 TS-3 packet 224.

The pcr_offset_table indicates a local time difference of each stream. For example, when generating the pcr_offset_table in the case where the PCR value 230 of the second MPEG2 TS-1 packet 222 has been received, it is a matter of course that the difference from the MPEG2 TS-1 is 0. As for the difference from the MPEG2 TS-2, the difference value from the system clock calculated on the basis of the PCR value 231 of the first MPEG2 TS-2 packet 220 and the difference value from the system clock calculated on the basis of the PCR value 230 of the second MPEG2 TS-1 packet 222 should be added up. A difference value from the PCR value of the MPEG2 TS-3 can be obtained in the same way. The multiplexer 205 generates pcr_offset_table by conducting the above-described processing whenever receiving the PCR value of each stream.

Owing to the configuration heretofore described, it becomes possible to conduct stream multiplexing with a simple alteration without causing a serious program synchronization failure, even when multiplexing a plurality of streams each having program synchronization.

In the present embodiment, it has been supposed for brevity that the bit rate on the transmission path 206 is the same as the intended bit rates of the input streams. In fact, however, it does not hold true in some cases. In that case, it is necessary to first conduct correction on the arrival time on the basis of a difference between the bit rate on the transmission path 206 and the intended bit rate of the stream. The correction can be conducted by using the technique described with reference to the present embodiment.

Furthermore, in the present embodiment, the packet arrival time is corrected by using the number of new packets inserted by the multiplexer 205 as it is. However, the correction means for the packet arrival time is not limited to this. For example, the calculation may be conducted in the multiplexer 205 instead of the demultiplexer 208 and the result of the calculation may be described on the packet.

In addition, the present embodiment shows one example of the present invention, and the present embodiment does not restrain the present invention. The system configuration and the structure of the multiplexed packet can be altered as long as they are based on the spirit of the present invention.

The present embodiment has been described by taking an MPEG2 TS as an example. Even if an MPEG2 PS is used, however, processing can be conducted in the same way as the foregoing description.

Third Embodiment

Figure 8:
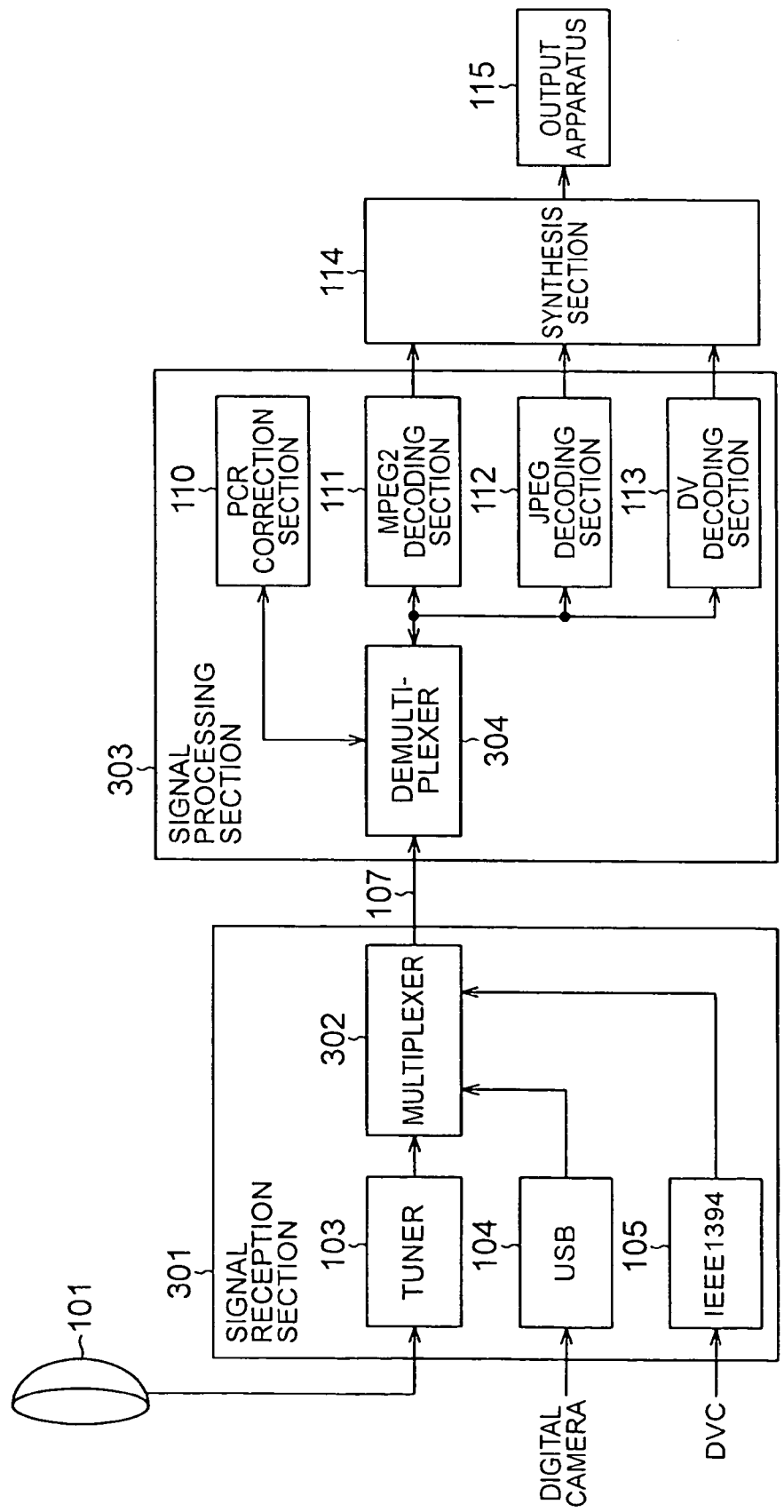
FIG. 8 is a block diagram showing a configuration example of a digital broadcast reception apparatus in a third embodiment of the present invention.

Hereafter, a third embodiment of the present invention will be described with reference to the drawings. FIG. 8 is a block diagram showing a configuration example of a digital broadcast reception apparatus according to the present embodiment.

In the present embodiment, a signal reception section receives an MPEG2 TS input from a tuner, JPEG data input from a digital camera, and a DV stream input from a DVC, conducts time division multiplexing on them, and transmits a resultant signal to a signal processing section, and the signal processing section decodes the MPEG2 TS, JPEG, DV, and synthesizes and displays an output image.

In FIG. 8, components conducting the same operation as those in the first embodiment are denoted by the same reference numerals as those in FIG. 1, and detailed description thereof will be omitted. Numeral 301 denotes a signal reception section in the present system. Numeral 302 denotes a multiplexer for conducting time division multiplexing on various data trains input from the digital broadcast reception tuner 103 and various interfaces 104 and 105 while adding a SYNC pattern, which differs depending upon the kinds of multiplexed streams. Numeral 303 denotes a signal processing section in the present system. Numeral 304 denotes a demultiplexer for demultiplexing time division multiplexed data multiplexed by the multiplexer 302 and counting the number of packets inserted in an original single stream.

The signal reception section 301 in the present system receives a digital broadcast signal received by the antenna 101, an image signal supplied from the digital camera, and a DV signal supplied from a DVC. The signal reception section 301 is a processing section for conducting processing on an input signal based on the user's input and the data input. The signal reception section 301 has a digital broadcast reception tuner 103, a USB interface 104 and an IEEE 1394 interface 105. The digital broadcast reception tuner 103, the USB interface 104 and the IEEE 1394 interface 105 receive a MPEG2 signal of digital broadcast, a JPEG signal from the digital camera, and a DV stream from the DVC, respectively. The received signals are sent to the multiplexer 302 and multiplexed therein.

Figure 10A:
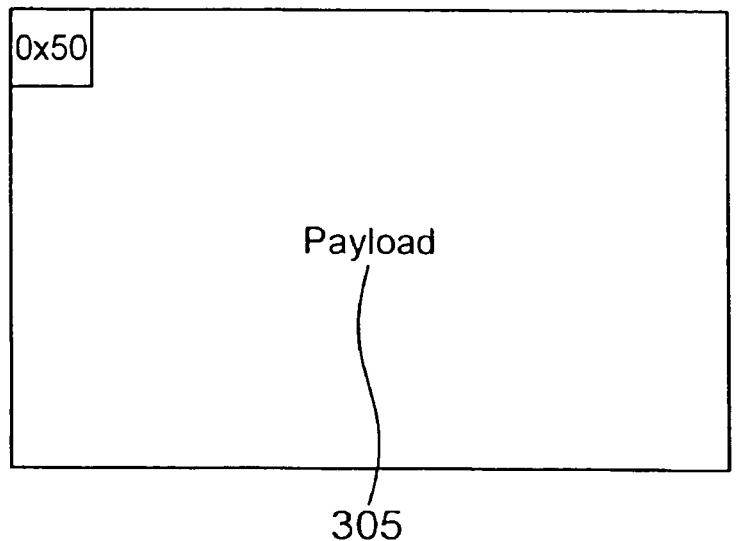
FIG. 10 is a diagram showing a structure example of a packet generated by a multiplexer in the third embodiment of the present invention.
Figure 10B:
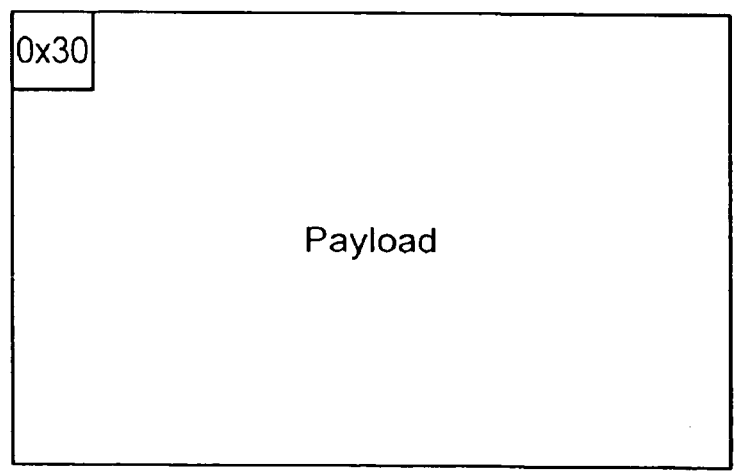

The SYNC pattern is 0×47 for MPEG2 TS. For other arbitrary packets, the value of the SYNC pattern is predetermined, for example, as shown in FIG. 9. As for MPEG2 TS packets, nothing changes. When multiplexing JPEG data, the JPEG data is inserted intact after a SYNC pattern 0×50, which indicates JPEG data, as shown in FIG. 10A. The same holds true of DV data, as well. DV data is inserted intact after a SYNC pattern 0×30, which indicates DV data, as shown in FIG. 10B.

The signals multiplexed by the multiplexer 302 are sent to the signal processing section 303 via the transmission path 107. The band on the transmission path 107 is arbitrary. The signal processing section 303 is a processing section for decoding the signal group input from the transmission path 107 and outputting the decoded signal group.

The demultiplexer 304 receives packets multiplexed by the multiplexer 302, and conducts demultiplexing processing. Furthermore, the demultiplexer 304 calculates a PCR correction value on the basis of the PCR information added to the original TS packets, the number of packets inserted between the original TS packets, and the bit rate on the transmission path 107, and sends the calculated PCR correction value to the PCR correction section 110. The number of packets inserted between the original TS packets is counted by the demultiplexer 304.

The PCR correction section 110 corrects the system clock in PCR fluctuation on the basis of the information. The PCR correction section 110 conducts PCR reference time correction as well. The MPEG2 decoding section 111 conducts the ordinary MPEG2 decoding, and outputs an image and voice on the basis of the system clock corrected by the PCR correction section 110. The JPEG decoding section 112 and the DV decoding section 113 may be ordinary ones. Resultant image group are synthesized by the synthesis section 114, and output from the image display apparatus (output apparatus) 115 as a multi-view.

Operation of the multiplexer 302 will now be described concretely. The multiplexer 302 receives inputs from the digital broadcast reception tuner 103 and the input/output interfaces 104 and 105. As for MPEG2 TS, the multiplexer 302 makes it intact. As for JPEG/DV data, the multiplexer 302 generates data of a packet form having a fixed size as shown in FIG. 3 from respective data. The packet size must be the same as that of the MPEG2 TS, and it is 188 bytes. Each stream main body is disposed in the payload region 305. Packets are arranged in appropriate order, and output from the transmission path 107. The packet order may be determined as desired. In the present embodiment, packets are arranged in the order in which packets are input from the digital broadcast reception tuner 103 and the input/output interfaces 104 and 105. A schematic diagram of multiplexing is shown in FIG. 11.

In FIG. 11, numeral 306 denotes an original MPEG2 TS stream. Numeral 307 denotes an original JPEG stream. Numeral 308 denotes an original DV stream. Numeral 309 denotes a multiplexed stream generated in the present embodiment. Numeral 310 denotes a first MPEG2 TS packet, 311 a first JPEG packet, 312 a first DV packet, 313 a second MPEG2 TS packet, and 314 a third MPEG2 TS packet.

The demultiplexer 304 conducts time division demultiplexing on the basis of the SYNC pattern added by the multiplexer 302, counts the number of new packets multiplexed between original MPEG2 TS packets, and corrects packet arrival time indicated by the PCR on the basis of the counted number of packets. Specifically, the demultiplexer 304 corrects the original arrival time indicated by the PCR so as to obtain a delayed PCR value on the basis of the counted number of packets, the packet size and the bit rate. The technique of correcting the PCR value on the basis of the counted number of packets is the same as that described with reference to the first embodiment.

The PCR correction section 110 calculates the PCR fluctuation quantity by using the PCR value corrected by the above-described calculation and using the actual arrival time, and corrects the system clock in PCR fluctuation. The correction is also the same as that in the first embodiment.

Owing to the configuration and processing heretofore described, it becomes possible to multiplex the MPEG2 TS with arbitrary data while maintaining the synchronization information. In the present embodiment, however, the number of newly inserted packets is counted by the demultiplexer 304. Therefore, a plurality of streams having the same SYNC pattern cannot be multiplexed. As for the MPEG2 TS, however, any operation is not conducted on packets. In the case where the demultiplexer 304 side does not correspond to the time division multiplexing according to the present embodiment, therefore, there is a merit that it becomes possible to receive and decode the original MPEG2 TS by only discarding packets having an SYNC pattern that is not 0×47.

By the way, the present embodiment shows one example of the present invention, and the present embodiment does not restrain the present invention. The system configuration and the structure of the multiplexed packet can be altered as long as they are based on the spirit of the present invention.

Fourth Embodiment

Figure 12:
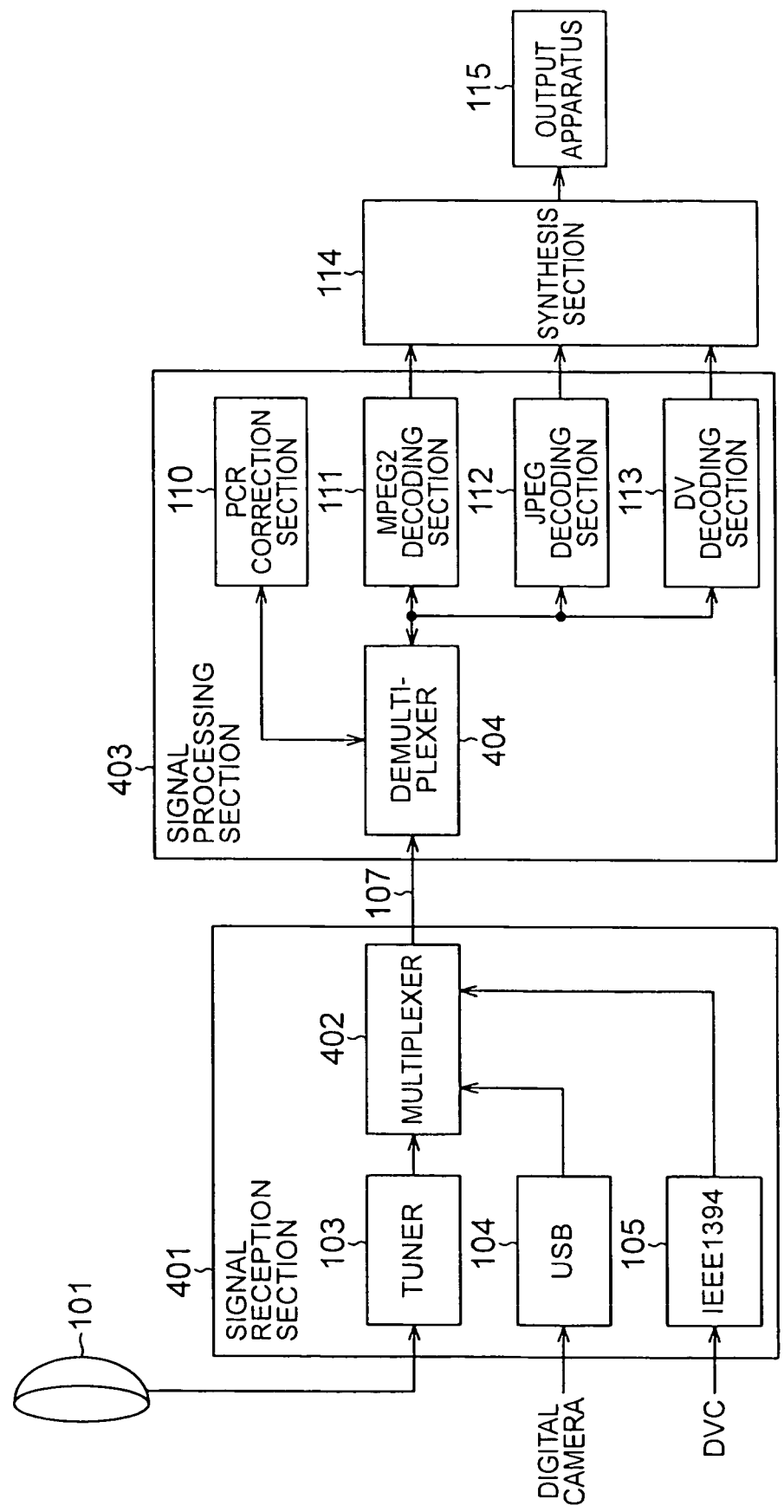
FIG. 12 is a block diagram showing a configuration example of a digital broadcast reception apparatus in a fourth embodiment of the present invention.

Hereafter, a fourth embodiment of the present invention will be described with reference to the drawings. FIG. 12 is a block diagram showing a configuration example of a digital broadcast reception apparatus according to the present embodiment.

In FIG. 12, components conducting the same operation as those in the first embodiment are denoted by the same reference numerals as those in FIG. 1, and detailed description thereof will be omitted. Numeral 401 denotes a signal reception section in the present system. Numeral 402 denotes a multiplexer for conducting time division multiplexing on various data trains input from the digital broadcast reception tuner 103 and various interfaces 104 and 105 while adding a SYNC pattern, which differs depending upon the kinds of multiplexed streams and the number of packets inserted between original streams. Numeral 403 denotes a signal processing section in the present system. Numeral 404 denotes a demultiplexer for demultiplexing time division multiplexed data multiplexed by the multiplexer 402.

The present embodiment differs from the third embodiment in that the SYNC pattern is not stipulated beforehand, and the multiplexer 402 generates an SYNC pattern correspondence table, multiplexes the SYNC pattern correspondence table with a stream, and provides the SYNC pattern with information of the number of newly multiplexed packets. The present embodiment is not changed from the third embodiment in other structure.

The SYNC pattern added by the multiplexer 402, and operation of the demultiplexer 404 and the PCR correction section 110 will now be described more concretely.

Figure 13:
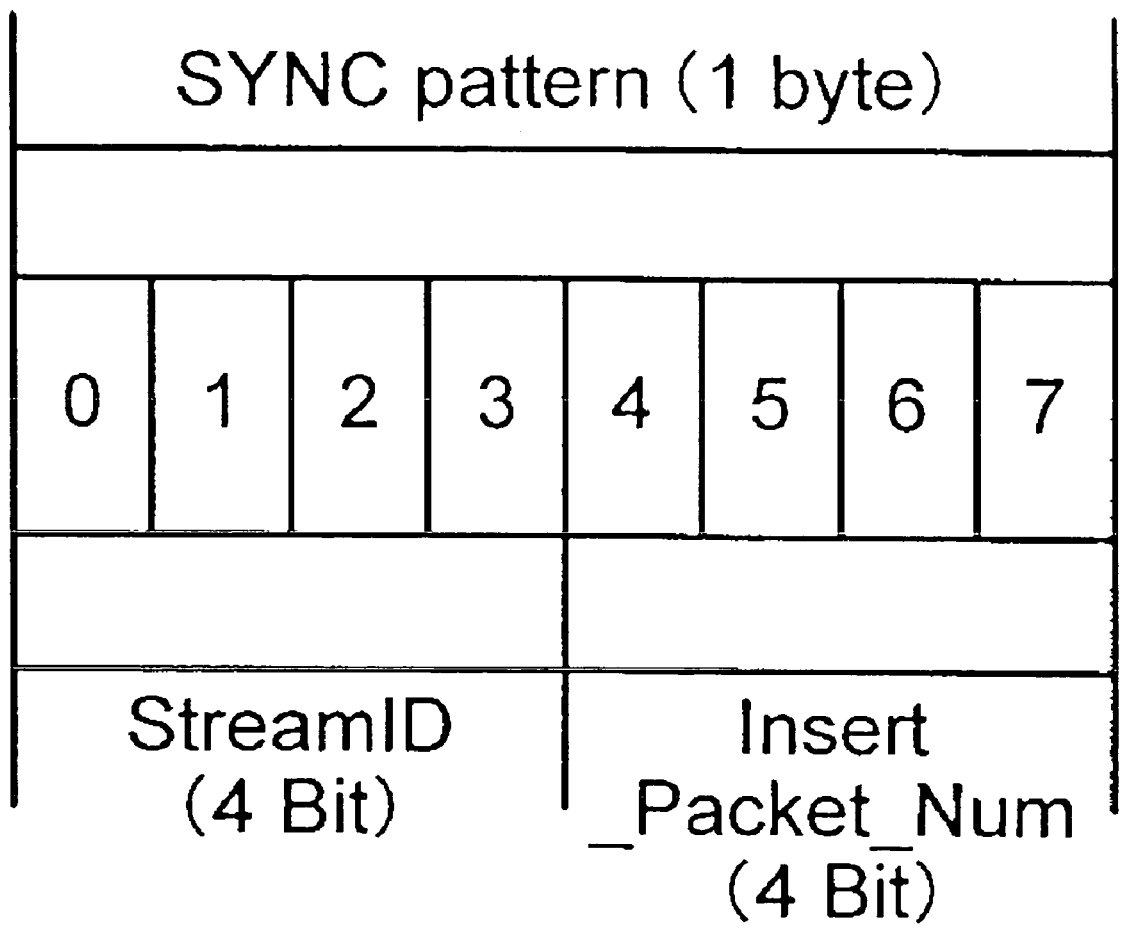
FIG. 13 is a diagram showing an example of an SYNC pattern added by a multiplexer in the fourth embodiment of the present invention.

The SYNC pattern added by the multiplexer 402 includes information added so as to be able to demultiplex the multiplexed information in the demultiplexer 404, and information added as the packet arrival time correction information. FIG. 13 shows the SYNC pattern. The information added so as to be able to demultiplex the multiplexed information is added to high order four bits in the SYNC pattern. The number of newly inserted packets is added to low order four bits in the SYNC pattern as the information for correcting the packet arrival time.

The information added to high order four bits in the SYNC pattern is information indicating the kind of the stream. In the present embodiment, the SYNC pattern correspondence table is multiplexed to the packet having the SYNC pattern of 0×11 so as to represent the various stream in four bits. In the present embodiment, the SYNC pattern packet to which the SYNC pattern correspondence table is multiplexed has been defined as 0×11. However, the multiplexed pattern is not limited to this, but may be arbitrary, as long as the pattern is a pattern that can be recognized in common by the multiplexer 402 and the demultiplexer 404.

The SYNC pattern correspondence table is multiplexed at fixed time intervals. An example of the SYNC correspondence table is shown in FIG. 14. The information added to low order four bits in the SYNC pattern is the number of new multiplexed packets inserted between original MPEG2 TS packets. In the example shown in FIG. 11, the first MPEG2 TS packet 310 and the second MPEG2 TS packet 313 are consecutive packets on the original MPEG2 TS stream 306. In the multiplexer 402, however, the first JPEG packet 311 and the first DV packet 312 are inserted between the first MPEG2 TS packet 310 and the second MPEG2 TS packet 313. Therefore, a numerical value "2" is added to the low order four bits in the SYNC pattern in the second MPEG2 TS packet 313.

The demultiplexer 404 conducts demultiplexing on the basis of information for demultiplexing added by the multiplexer 402. The demultiplexer 404 first waits until a packet of 0×11 is received, and acquires a correspondence table of the SYNC pattern. After the demultiplexer 404 has acquired the correspondence table of the SYNC pattern, the demultiplexer 404 demultiplexes the multiplexed stream on the basis of the information specified in the correspondence table.

The demultiplexer 404 corrects packet arrival time indicated by the PCR on the basis of the packet arrival time correction information. Specifically, the demultiplexer 404 corrects the PCR value so as to obtain a PCR value obtained by delaying the original arrival time indicated by the PCR from the value indicated by the low order four bits in the SYNC packet and the packet size and the bit rate. The correction calculation expression is the same as that described with reference to the first embodiment.

The PCR correction section 110 calculates the PCR fluctuation quantity by using the PCR value corrected on the basis of the packet arrival time correction information and using the actual arrival time, and corrects the system clock in PCR fluctuation. The PCR correction section 110 conducts the PCR reference time correction as well. The correction technique is the same as that in the first embodiment.

Owing to the configuration and processing heretofore described, it becomes possible to multiplex the MPEG2 TS with arbitrary data while maintaining the synchronization information.

By the way, the present embodiment shows one example of the present invention, and the present embodiment does not restrain the present invention. The system configuration and the structure of the multiplexed packet can be altered as long as they are based on the spirit of the present invention.

Fifth Embodiment

Hereafter, a fifth embodiment of the present invention will be described with reference to the drawings. FIG. 15 is a block diagram showing a configuration example of a digital broadcast reception apparatus according to the present embodiment.

In the present embodiment, a signal reception section receives an MPEG2 TS input from a tuner, an MPEG2 TS input from a hard disk storing a recorded program, and a DV stream input from a DVC, conducts time division multiplexing on them, and transmits a resultant signal to a signal processing section, and the signal processing section decodes the two MPEG2 TSs and the DV, and synthesizes and displays an output image.

In FIG. 15, components conducting the same operation as those in the first embodiment are denoted by the same reference numerals as those in FIG. 1, and detailed description thereof will be omitted. In FIG. 15, components conducting the same operation as those in the second embodiment are denoted by the same reference numerals as those in FIG. 4, and detailed description thereof will be omitted. Numeral 501 denotes a signal reception section in the present system. Numeral 502 denotes a multiplexer for conducting time division multiplexing on a broadcast wave MPEG2 TS input from an antenna 101, a stored MPEG2 TS read out from a TS retention memory 204, and a DV stream input from an IEEE 1394 while adding packet arrival time correction information and inter-stream PCR difference information. Numeral 503 denotes a signal processing section in the present system. Numeral 504 denotes a demultiplexer for demultiplexing time division multiplexed data multiplexed by the multiplexer 502.

The digital broadcast signal received by the antenna 101, the stored broadcast signal input from the hard disk 201 via an HDD controller 202, and a DV signal input from a DVC are input to the signal reception section 501 in the present system. The signal reception section 501 has a digital broadcast reception tuner 103, an IEEE 1394 interface 105, and a TS retention memory 204. The digital broadcast reception tuner 103, the IEEE 1394 interface 105, and the TS retention memory 204 receive the MPEG2 of the digital broadcast, the DV stream from the DVC, and the stored MPEG2 from the hard disk, respectively. In the present embodiment, a state in which two TS inputs including the broadcast wave TS input from the antenna and the stored TS input from a storage medium, and one DV stream from the DVC are simultaneously input is supposed. The received signals are sent to the multiplexer 502 and multiplexed therein.

A packet generated by the multiplexer 502 is the same packet as that in the second embodiment, and it is shown in FIG. 5.

In other words, in the present embodiment as well, substances of two MPEG2 TSs and the DV stream enter the payload region 121. Various headers 116 to 120, the pcr_offset_table_size region 213, and the pcr_offset_table region 214 are added. In the header information, the arrival_revise region 120 is added as the packet arrival time correction information. In the present embodiment, the added information is the number of different MPEG2 TS packets and DV packet inserted between the original MPEG2 TS packets.

Furthermore, in the pcr_offset_table region 214, difference values between PCRs included in two MPEG2 TSs are added as the inter-stream PCR difference information. In order to fix the size of the pcr_offset_table region 214 in the packet, the table size is added to the pcr_offset_table_size region 213.

The signals multiplexed by the multiplexer 502 are sent to the signal processing section 503 in the system via the transmission path 107. The band on the transmission path 107 is arbitrary. The signal processing section 503 is a processing section for decoding the signal group input from the transmission path 107 and outputting the decoded signal group.

The demultiplexer 504 demultiplexes the packets multiplexed by the multiplexer 502, and corrects the PCR value, which indicates the packet arrival time, on the basis of the packet arrival time correction information (the arrival_revise region 120).

Furthermore, the demultiplexer 504 sends a PCR value of an MPEG2 TS serving as the reference for correcting the system clock selected by the user or the system, which has been corrected on the basis of the packet arrival time correction information, to the PCR correction section 209. The system clock is single. Even if there are a plurality of MPEG2 TSs, only one stream serves as the reference for the PCR fluctuation correction in the same way as the second embodiment.

Operation of the DV decoding section 113 is the same as that in the first embodiment. The PCR correction section 209 and the MPEG2 decoding section 210 are the same as those in the second embodiment. Resultant streams obtained by the decoding processing are synthesized by the synthesis section 114 and output from the image display apparatus (output apparatus) 115 as a multi-view.

Operation of the multiplexer 502 and the inter-stream PCR difference information will now be described concretely.

Packet multiplexing operation in the multiplexer 502 is conducted in the same way as that in the first and second embodiments. Information added for demultiplexing to be conducted in the demultiplexer 504 is the same as that in the first and second embodiments.

The present embodiment differs from the first and second embodiments in that there are a plurality of MPEG2 TSs, i.e., a plurality of streams each having program synchronization information and a DV stream having no synchronization information is simultaneously multiplexed.

As already described with reference to the second embodiment, two MPEG2 TS streams have PCRs generated at different points in time. Therefore, a stream serving as the reference for correction is selected, and processing of aligning the stream time is conducted.

Actual operation of the multiplexer 502 becomes combination of the processing conducted in the first embodiment and the processing conducted in the second embodiment. As the packet arrival time correction information, the number of packets in the other MPEG2 TS and the DV is used. An example of a multiplexed stream generated by the multiplexer 502 and the inter-program PCR difference information is shown in FIG. 16.

In FIG. 16, numeral 505 denotes an MPEG2 TS-1 stream of an original broadcast wave, 506 an original stored MPEG2 TS-2 stream, and 507 an original DV stream. Numeral 508 denotes a multiplexed stream according to the present embodiment. Numeral 509 a first broadcast wave MPEG2 TS-1 packet, 510 a first stored MPEG2 TS-2 packet, and 511 a first DV packet. Numeral 512 a second broadcast wave MPEG2 TS-1 packet, 513 a second stored MPEG2 TS-2 packet, and 514 a second DV packet. Numeral 515 denotes a pcr_offset_table added to the first broadcast wave MPEG2 TS-1 packet 509. Numeral 516 denotes a pcr_offset_table added to the first stored MPEG2 TS-2 packet 510.

Each inter-program PCR difference information has PCR difference information between two MPEG2 TS streams. This aims at preventing the program synchronization information from failing even if the user or system selects one of the streams as the clock reference.

The demultiplexer 504 checks whether the packet is a packet including the program synchronization information on the basis of the information of stream_type 118. If the packet is a packet including the program synchronization information, then the demultiplexer 504 checks whether a stream including the packet has been selected as the clock reference. If the stream including the packet is a stream (clock reference stream) selected as the clock reference, then the inter-stream PCR difference information is not used. In this case, the demultiplexer 504 corrects the PCR value on the basis of the packet arrival time correction information and notifies the PCR correction section 209 of the PCR correction value in the same way as the first and second embodiments.

Operation conducted when a stream type indicated by the stream_type 118 is a stream including the program synchronization information and is not a clock reference stream has already been described with reference to the second embodiment. In other words, after a PCR value has first been corrected on the basis of the packet arrival time correction information, a PCR difference value between a clock reference stream and its own PCR is acquired on the basis of the inter-stream PCR difference information and the PCR value is further corrected.

If the stream type indicated by the stream_type 118 is a stream that does not include the program synchronization information, i.e., a DV stream in the present embodiment, then the payload section 121 is only output to the DV decoding section 113.

With reference to the example shown in FIG. 6, concrete PCR value correction will now be described. If the broadcast wave MPEG2 TS-1 is specified as the stream reference, then operation is conducted in the same way as the first embodiment as regards the broadcast wave MPEG2 TS-1. In other words, it is indicated in the arrival_revise region 120, which is the packet arrival time correction information, that there are two packets between the original MPEG2 TSs in the same way as the first embodiment. Supposing that the first MPEG2 TS-1 packet 219 and the second MPEG2 TS-1 packet are respectively 10000 and 13000 in PCR and the packet size and the bit rate are respectively 256 bytes and 30 Mbps, the PCR value based on the packet arrival time correction information becomes 13515 (10000+3515=13515) as calculated in the first embodiment.

Time correction conducted for the stored MPEG2 TS-2 when the broadcast wave MPEG2 TS-1 has been selected as the PCR reference is the same as that in the second embodiment. In other words, in the arrival_revise region representing the packet arrival time correction information, "2" representing that the first broadcast wave MPEG2 TS-1 packet 509 and the first DV stream packet 511 have been inserted is indicated in the first stored MPEG2 TS-2 packet 510. As calculated in the first embodiment, a first PCR value is obtained by adding 3515 to the PCR. It is found that the PCR offset for the broadcast wave MPEG2 TS-1 is +7700 on the basis of pcr_offset_table 515 added to the first stored MPEG2 TS-2 packet 510. Therefore, addition is conducted. The PCR value after application of the inter-program PCR difference information becomes 13515 by adding up 2300, 3515 and 7700 (2300+3515+7700).

The technique for generating the pcr_offset_table serving as the inter-program PCR difference information is also the same as that in the second embodiment, and consequently description thereof will be omitted.

The present embodiment shows one example of the present invention, and the present embodiment does not restrain the present invention. The system configuration and the structure of the multiplexed packet can be altered as long as they are based on the spirit of the present invention.

The present embodiment has been described by taking an MPEG2 TS as an example. Even if an MPEG2 PS is used, however, processing can be conducted in the same way as the foregoing description.

Other Embodiments of the Present Invention

Implementation of the above-described embodiments by providing a computer in an apparatus or system connected to various devices with program codes of software and activating the various devices in accordance with a program stored in the computer (CPU or MPU) in the apparatus or system is also included in the category of the present invention.

In this case, the program code itself of the software implements the function of the above-described embodiments. The program code itself and means for providing the computer with the program code, such as a recording medium storing the program code, constitute the present invention. As a recording medium for storing the program code, for example, a flexible disk, a hard disk, an optical disk, a photomagnetic disk, a CD-ROM, magnetic tape, a nonvolatile memory card, a ROM or the like can be used.

Furthermore, it is a matter of course that the program code is incorporated in an embodiment of the present invention, not only in the case where the function of the above-described embodiments is implemented by execution of the supplied program code in the computer, but also in the case where the function of the above-described embodiments is implemented by cooperation of the program code with an OS (Operating System) or other application software which are executed in the computer.

In addition, it is a matter of course that the program code is also incorporated in the present invention, in the case where the supplied program code is stored in a memory included in a function expansion board of a computer or a function expansion unit connected to the computer and thereafter a CPU or the like included in the function expansion board or the function expansion unit conducts a part or whole of actual processing on the basis of an order of the program code and the function of the above-described embodiments is implemented by the processing.

What is claimed is:

1. A digital data processing apparatus, comprising:
   a first input section that inputs a first data stream having a first data format;
   a second input section that inputs a second data stream having a second data format different from the first data format; and
   a multiplexer that divides the first data stream and the second data stream into packets each having a same size, and adds packet arrival time correction information to packets obtained by the dividing, and conducts time division multiplexing on the packets to generate a multiplexed stream,
   wherein the first data stream having the first data format is an MPEG2 transport stream or an MPEG2 program stream, and
   wherein the packet arrival time correction information includes information obtained by correcting a PCR added to a packet in the MPEG2 transport stream or an SCR added to a packet in the MPEG2 program stream by using information based on the number of packets in arbitrary data newly inserted between the packets having the added PCR or SCR.

2. A digital data processing apparatus according to claim 1, wherein said multiplexer counts the number of packets in the arbitrary data newly inserted between packets in the MPEG2 transport stream, and corrects a PCR added to the MPEG2 transport stream on the basis of the counted number of packets.

3. A digital data processing apparatus, comprising:
   a first input section that inputs a first data stream having a first data format;
   a second input section that inputs a second data stream having a second data format different from the first data format; and
   a multiplexer that divides the first data stream and the second data stream into packets each having a same size, and adds packet arrival time correction information to packets obtained by the dividing, and conducts time division multiplexing on the packets to generate a multiplexed stream,
   wherein the first data stream having the first data format is an MPEG2 transport stream or an MPEG2 program stream, and
   wherein the packet arrival time correction information includes information based on a difference of a PCR added to a packet in the MPEG2 transport stream or a difference of an SCR added to a packet in the MPEG2 program stream.

4. A digital data processing method comprising:
   a first input step of inputting a first data stream having a first data format;
   a second input step of inputting a second data stream having a second data format different from the first data format; and
   a multiplexing step of dividing the first data stream and the second data stream into packets each having a same size, and adding packet arrival time correction information to packets obtained by the dividing, and conducting time division multiplexing on the packets to generate a multiplexed stream,
   wherein the first data stream having the first data format is an MPEG2 transport stream or an MPEG2 program stream, and
   wherein the packet arrival time correction information includes information based on a difference of a PCR added to a packet in the MPEG2 transport stream or a difference of an SCR added to a packet in the MPEG2 program stream.

5. A computer-readable storage medium on which is stored a computer executable program for a digital data processing method comprising:
   a first input step of inputting a first data stream having a first data format;
   a second input step of inputting a second data stream having a second data format different from the first data format; and
   a multiplexing step of dividing the first data stream and the second data stream into packets each having a same size, and adding packet arrival time correction information to packets obtained by the dividing, and conducting time division multiplexing on the packets to generate a multiplexed stream,
   wherein the first data stream having the first data format is an MPEG2 transport stream or an MPEG2 program stream, and
   wherein the packet arrival time correction information includes information based on a difference of a PCR added to a packet in the MPEG2 transport stream or a difference of an SCR added to a packet in the MPEG2 program stream.

* * * * *

UNITED STATES PATENT AND TRADEMARK OFFICE
CERTIFICATE OF CORRECTION

PATENT NO. : 7,260,149 B2
APPLICATION NO. : 10/891107
DATED : August 21, 2007
INVENTOR(S) : Kirihara et al.

It is certified that error appears in the above-identified patent and that said Letters Patent is hereby corrected as shown below:

<u>COLUMN 1</u>:
      Line 11, "No.2003-277077" should read -- No. 2003-277077 --.

<u>COLUMN 2</u>:
      Line 67, "an other data in concurrent" should read -- and other data concurrently --.

<u>COLUMN 3</u>:
      Line 25, "addition" should read -- additional --.

<u>COLUMN 4</u>:
      Line 18, "IEEE1394" should read -- IEEE 1394 --.

<u>COLUMN 6</u>:
      Line 44, FIG. 3, The" should read -- FIG. 3, the --; and
      Line 51, "expression (2)" should read -- expression (2). --.

<u>COLUMN 7</u>:
      Line 37, "base on" should read -- based on --; and
      Line 46, "MPEG2 PS" should read -- MPEG2 TS --.

<u>COLUMN 10</u>:
      Line 42, "second MPEG2 TS-1 packet" should read -- second MPEG2 TS-1 packet 223 --.

<u>COLUMN 11</u>:
      Line 54, "MPEG2 PS" should read -- MPEG2 TS --.

<u>COLUMN 12</u>:
      Line 67, "group" should read -- groups --.

<u>COLUMN 14</u>:
      Line 43, "stream" should read -- streams --.

UNITED STATES PATENT AND TRADEMARK OFFICE
CERTIFICATE OF CORRECTION

PATENT NO. : 7,260,149 B2
APPLICATION NO. : 10/891107
DATED : August 21, 2007
INVENTOR(S) : Kirihara et al.

It is certified that error appears in the above-identified patent and that said Letters Patent is hereby corrected as shown below:

COLUMN 17:
Line 13, "combi-" should read -- a combi- --.

COLUMN 18:
Line 42, "MPEG2 PS" should read -- MPEG2 TS --.

Signed and Sealed this

Seventh Day of October, 2008

JON W. DUDAS
*Director of the United States Patent and Trademark Office*